United States Patent [19]
Richardson

[11] Patent Number: 5,803,513
[45] Date of Patent: Sep. 8, 1998

[54] RESTRAINED SEALED BOLTED JOINTS OF FLUID PIPING SYSTEMS, INCLUSIVE OF AN IMPROVED GLAND, AN ADDED COMPRESSION CONTROL RING, AND/OR ADDED SKID PADS PLACED ON A GRIP RING

[76] Inventor: Robert J. Richardson, 20104 Cascade St. E., Bonney Lake, Wash. 98390

[21] Appl. No.: 662,919

[22] Filed: Jun. 13, 1996

[51] Int. Cl.⁶ .......................... F16L 19/02; F16L 19/065; F16L 19/08
[52] U.S. Cl. .......................... 285/342; 285/337; 285/356
[58] Field of Search .................... 285/322, 323, 285/337, 342, 343, 348, 356

[56] References Cited

U.S. PATENT DOCUMENTS

| | | | |
|---|---|---|---|
| 2,349,180 | 5/1944 | Lamont | 285/87 |
| 2,478,149 | 8/1949 | Wolfram et al. | 285/122 |
| 2,832,615 | 4/1958 | Summers | 285/342 |
| 3,594,023 | 7/1971 | Yano | 285/337 |
| 3,733,093 | 5/1973 | Seiler | 285/342 |
| 3,861,722 | 1/1975 | Kenyon | 285/337 |
| 3,941,410 | 3/1976 | Miyaoka | 285/321 |
| 4,119,335 | 10/1978 | Rieffle et al. | 285/323 X |
| 4,711,426 | 12/1987 | Bodnar | 285/323 X |
| 4,832,379 | 5/1989 | Smith et al. | 285/323 |
| 4,867,488 | 9/1989 | Jones | 285/323 X |
| 5,335,946 | 8/1994 | Dent et al. | 285/243 |

FOREIGN PATENT DOCUMENTS

| | | | |
|---|---|---|---|
| 69265 | 10/1974 | Australia | 285/342 |
| 1580069 | 8/1969 | France | 285/337 |

*Primary Examiner*—John A. Ricci
*Attorney, Agent, or Firm*—Roy E. Mattern, Jr.

[57] ABSTRACT

In restrained sealed bolted joints of fluid piping systems, including both plastic and metallic pipe, improvements have previously been made in providing adequate grip rings to keep the inserted ends of pipe in place. When larger diameter pipes, especially larger diameter plastic pipes, were inserted into these sealed bolted joints, some difficulties were encountered. Therefore, a compression control ring is now provided to controllably transfer and to limit the tightening force component, which moves the gasket into sealing contacts with the respective pipe sections being joined. Also circumferentially spaced skid pads are positioned about each grip ring, assuring each respective grip ring will not prematurely commence gripping a pipe. In addition, the gland has been improved, so any possible large assembly forces, or any large fluid pressures in the piping system will not be effective in distorting the gland.

35 Claims, 8 Drawing Sheets

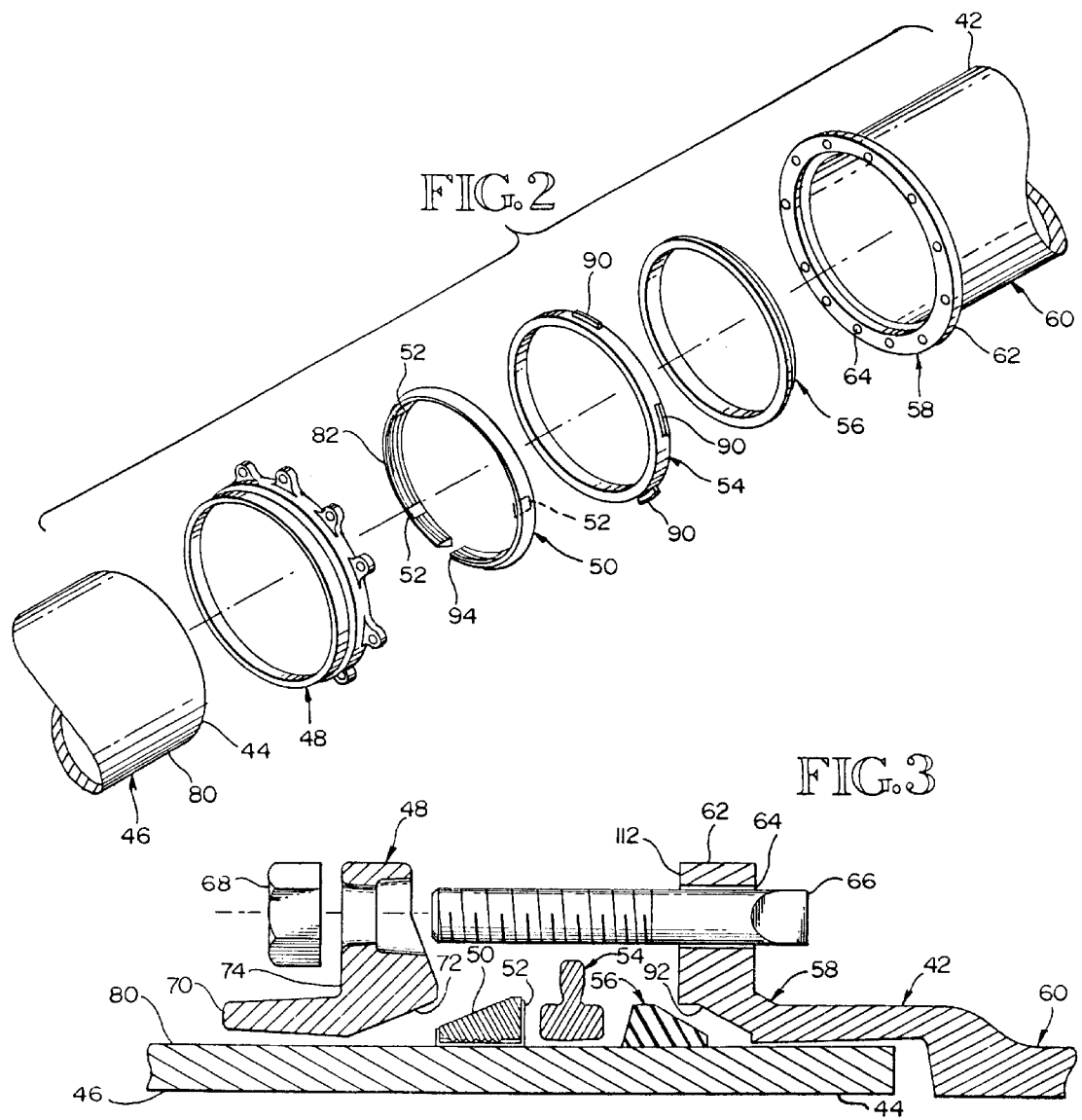

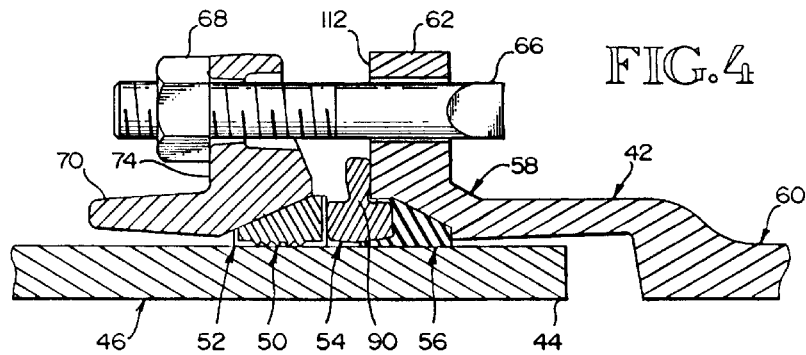
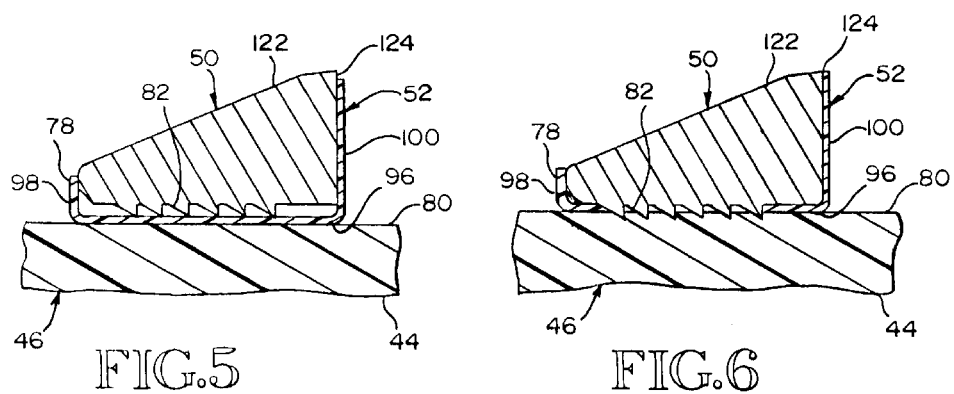
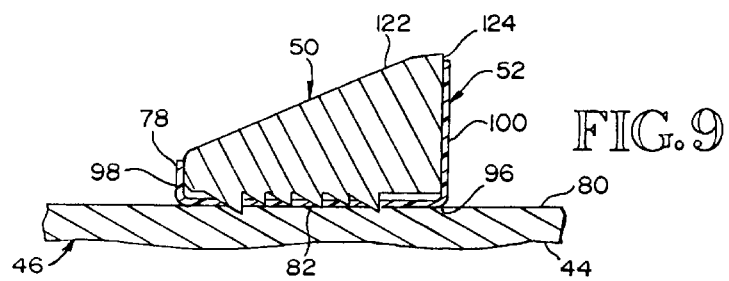

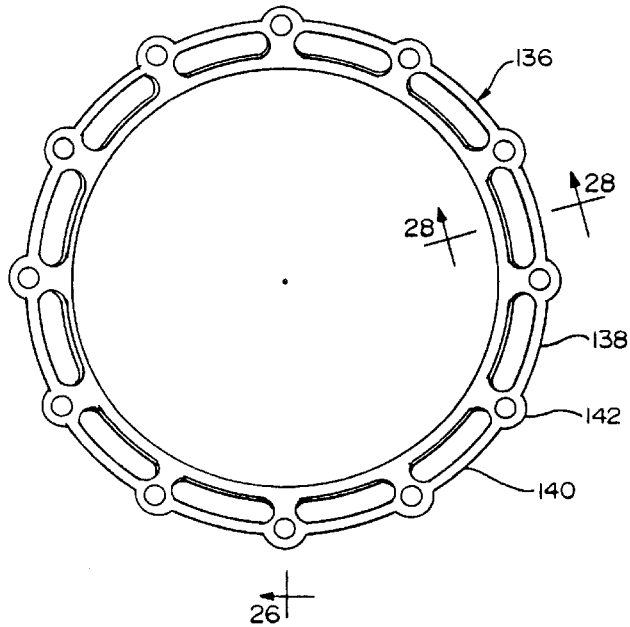
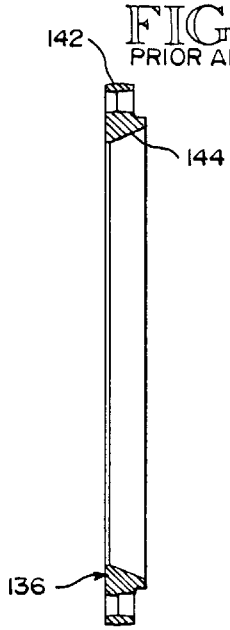
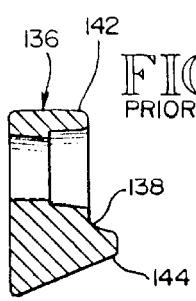
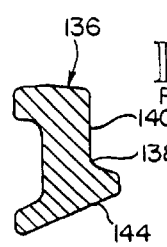
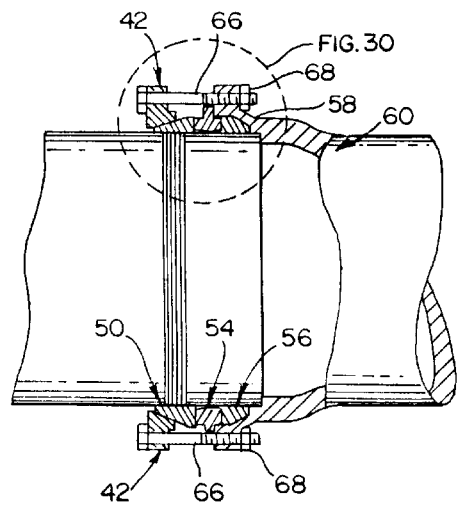
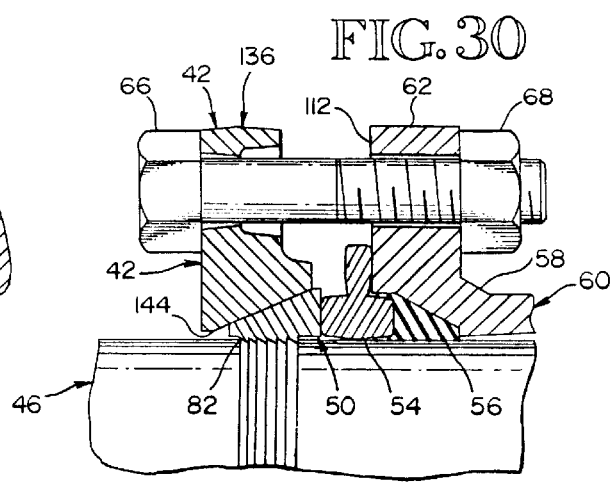

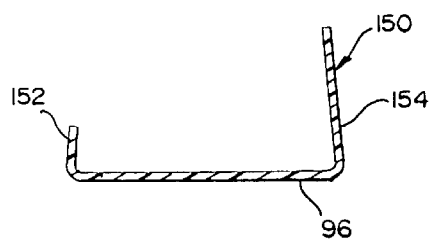
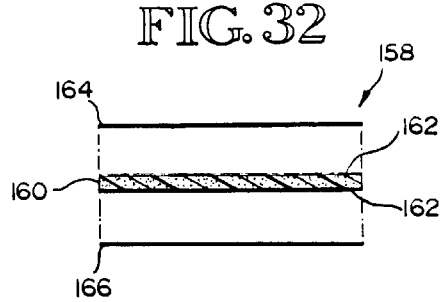
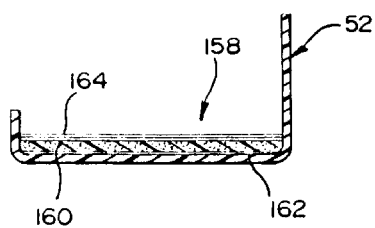
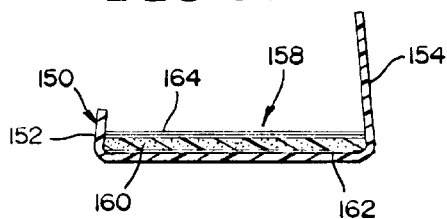
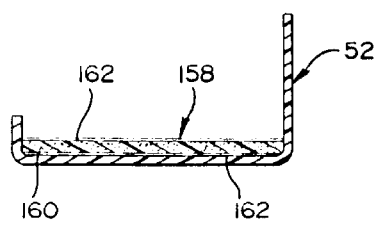
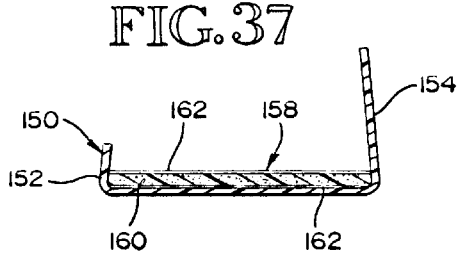
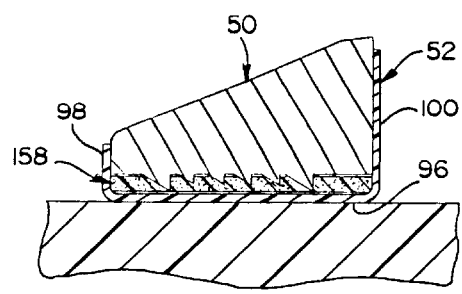
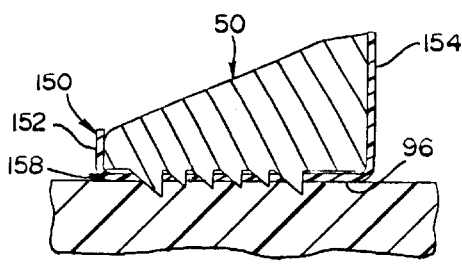

RESTRAINED SEALED BOLTED JOINTS OF FLUID PIPING SYSTEMS, INCLUSIVE OF AN IMPROVED GLAND, AN ADDED COMPRESSION CONTROL RING, AND/OR ADDED SKID PADS PLACED ON A GRIP RING

BACKGROUND

As set forth in the background of U.S. Pat. No. 5,335,946 entitled Cooperating Combination of a Gland and a Grip Ring Installed in Restrained Sealed Bolted Joints of Fluid Piping Systems, Including Both Plastic Pipe and Metallic Pipe, and as set forth in the U.S. Pat. No. 5,335,946, improvements have been made to make the resulting restrained sealed bolted joints very effective throughout their operating life.

In U.S. Pat. No. 4,878,698 of 1989, R. Fowler Gilchrist illustrates and describes his metallic gland and metallic gripping ring used in restraining sealed bolted pipe joints of fluid piping systems, which include both plastic and metallic pipes. The gripping ring utilizes all alike teeth.

Also in respect to the use of plastic pipe in piping systems, Gerald L. Anderson and Phillip E. Frair, in their U.S. Pat. No. 4,569,542 of 1986, illustrated and described how the components of their bolted together, restrained pipe coupling are designed to provide clearance functions, so when the bolt fasteners are tightened, the gasket sealing pressures are achieved about the respective plastic pipe ends sequentially before an effective grip on the respective plastic pipes is attained by the respective lock ring, i.e. grip ring.

Then in U.S. Pat. No. 5,335,946 of 1994, a cooperating combination of a metallic gland and a metallic grip ring is illustrated and described when used with both plastic pipe and metallic pipe, which in turn are used in fluid piping systems, where these pipes are part of assembled restrained sealed bolted joints. The grip ring, in addition to two well spaced major sized teeth, has several spaced minor sized pipe gripping circumferential teeth located between and beyond the major sized teeth. The major sized teeth extend radially inwardly farther than the minor sized teeth within the grip ring. When the installed grip ring is restraining a metallic pipe, only the major size teeth are, in part, penetrating the metallic pipe. When this installed grip ring is restraining a plastic pipe both the major size teeth and the minor size teeth are penetrating the plastic pipe. The major size teeth take a lot of concentrated force, which is created when the fasteners of the bolted joint are tightened. The minor size teeth, which are closer together, are needed to provide more tooth contact area to spread out the restraining forces needed to hold the relatively weaker plastic pipes of comparable outside diameters within their respective restrained sealed bolted joints.

All these improvements have resulted in gainful advances in providing restrained sealed bolted joints of fluid piping systems, including both plastic pipe and metallic pipe. Yet, when larger diameter pipes were to be utilized in these fluid piping systems, and especially when such systems were under higher pressures, improvements were still needed to insure that restrained sealed bolted joints could be relied on, without the addition of supplemental restraining structures.

SUMMARY

In developing and utilizing restrained sealed bolted joints of fluid piping systems, which include both plastic and metallic pipes, improvements have been made in respect to using the glands and the grip rings, such as illustrated and described in U.S. Pat. No. 5,335,946. Especially in respect to fluid piping systems, having pipes of larger diameters additional effective improvements have now been made, which also are effective in respect to their use in many types and sizes of restrained sealed bolted joints. Each improvement is independently effective. However, when two improvements are used, a more effective result is obtained. Then when all three improvements are used, a very effective result is obtained, in creating an excellent restrained sealed bolted joint.

One improvement centers on the utilization of an integral compression control ring, formed, in respect to its cross section, to have, at preferably spaced circumferential locations, radially extending stop tabs. When a restrained sealed bolted joint, following the starting assembly thereof, is being tightened, as bolt and nut fasteners are being tightened, in respect to a preferred embodiment, a longitudinal extending portion of this compression control ring is receiving the closing component of force transmitted via the grip ring. Then via an oppositely directed longitudinal extending portion of this compression control ring, this closing component of the force is transmitted to the gasket to insure the gasket will sealably contact both of the pipe sections. However, to protect the gasket from receiving more force than necessary to sealably contact both the pipe sections, the stop tabs timely contact the flange of a pipe being sealably connected to the other piper whose end has been inserted beyond this flange.

A second improvement centers on an improved gland having an integral longitudinal rim like extension, also referred to as a backward extension, which substantially reduces any tendency of this improved gland to noticeably deflect upon the tightening of the nuts on the bolts of this bolted joint, or later when fluids under high pressures are being controlled in the overall fluid piping system.

A third improvement centers on the utilization of skid pads. Preferably, at least three of them, are circumferentially spaced about a respective grip ring. These skid pads insure that the grip ring will reach its proper location before completing its pipe gripping function. They provide a respective sliding surface structure, keeping the pipe gripping circumferential teeth of the grip ring from prematurely contacting the outer surface structure of a pipe. Yet, when the grip ring is reaching and has reached its proper position, then the pipe gripping circumferential teeth radially penetrate through the curved lower surface structure of each skid pad to complete the effective grip on the inserted plain end of the one overall pipe section.

DRAWINGS

The additional utilizations of a compression control ring, and/or a skid pad, and/or an improved gland, in a cooperating combination of a gland and a grip ring, installed in restrained sealed bolted joints, also referred to as mechanical joints, of fluid piping systems, including both plastic and metallic pipe, are illustrated in the drawings wherein:

FIG. 1 is an isometric view, with some portions removed, illustrating a fluid piping system locale, where these additional utilizations of compression control rings, skid pads, and/or improved glands are installed with grip rings;

FIG. 2 is an exploded isometric view, with some portions removed, illustrating a plain end of a pipe to be sealed, an improved gland, a grip ring having skid pads spaced about it, a compression control ring, a gaskets and another other pipe to be sealed having its flange;

FIG. 3 is a partial cross sectional view of the components shown in FIG. 2 with the addition of a T bolt and nut, illustrating their relative positioning before the bolted joint is tightened;

FIG. 4 is a partial cross sectional view of the components shown in FIGS. 2 and 3, illustrating their positioning after the bolted joint is tightened;

FIG. 5 is an enlarged partial cross section of the grip ring having uniform pipe gripping circumferential teeth covered by a skid pad, at a locale where the grip ring is able to slide into position before these teeth make contact with the outer surface structure of a plastic pipe;

FIG. 6 is an enlarged partial cross section of the grip ring having uniform pipe gripping circumferential teeth covered by a skid pad, at a locale where the grip ring is gripping the outer surface structure of a plastic pipe;

FIG. 7 is an enlarged partial cross section of the grip ring having a combination of larger and smaller pipe gripping circumferential teeth covered by a skid pad, at a locale where the grip ring is able to slide into position before these teeth make contact with the outer surface structure of a plastic pipe;

FIG. 8 is an enlarged partial cross section of the grip ring having a combination of larger and smaller pipe gripping circumferential teeth covered by a skid pad, at a locale where the grip ring is gripping the outer surface structure of a plastic pipe;

FIG. 9 is an enlarged partial cross section of the grip ring having a combination of larger and smaller pipe gripping circumferential teeth covered by a skid pad, at a locale where the grip ring is gripping the outer surface structure of a metallic pipe;

Figure 14:
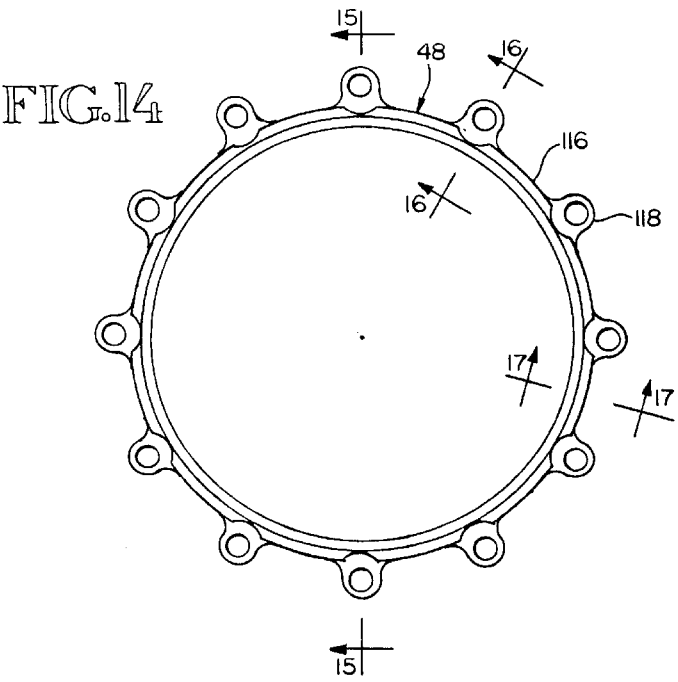
FIG. 14 is an elevational view of an improved gland illustrating how some material is no longer used in between the gland bolt hole loop structures, that will receive the bolts of a bolted joint.
Figure 15:
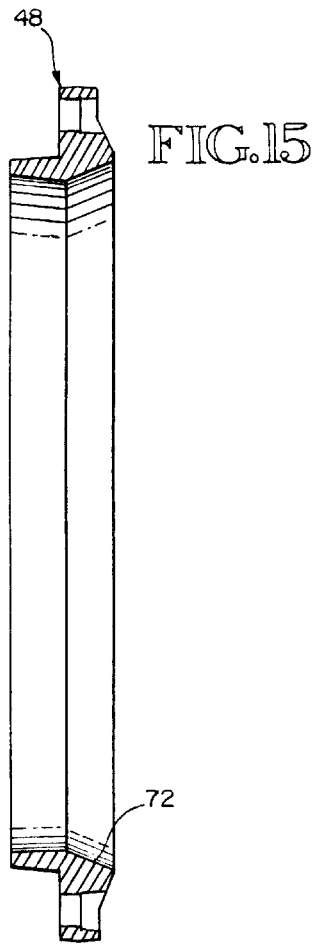
Figure 16:
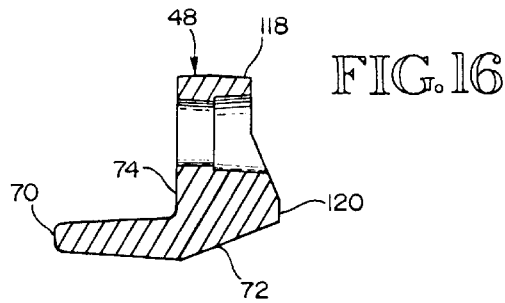
Figure 17:
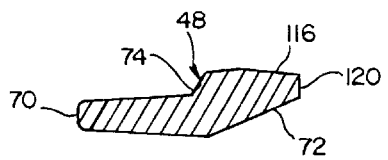
Figure 18:
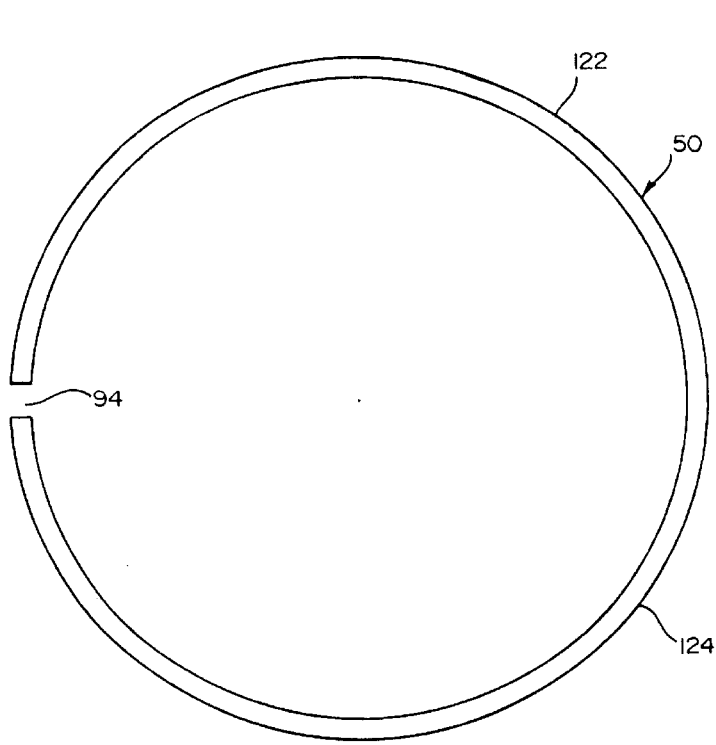
Figure 19:
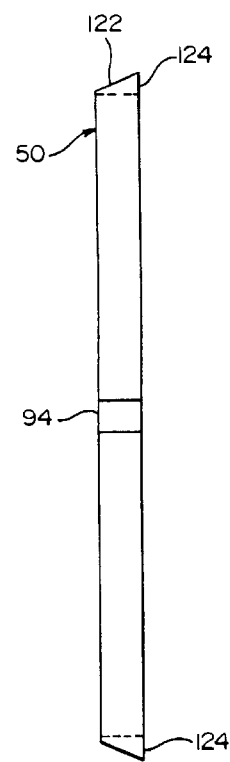
Figure 20:
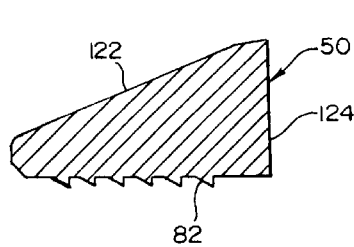
Figure 21:
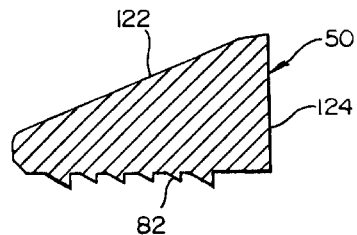
Figure 22:
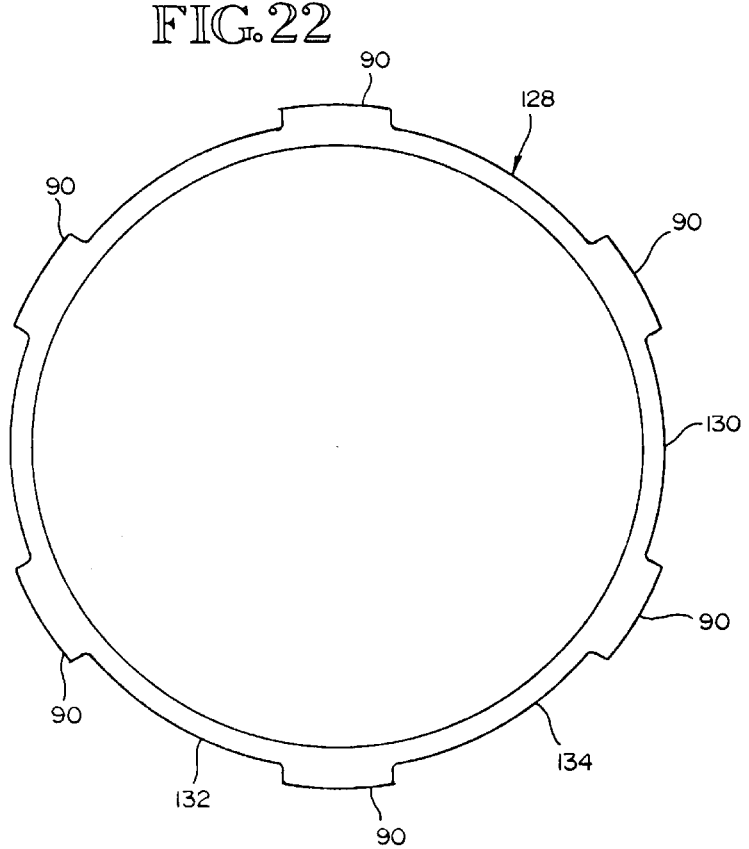
Figure 23:
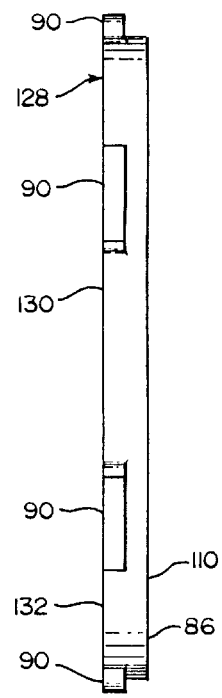
Figure 24:
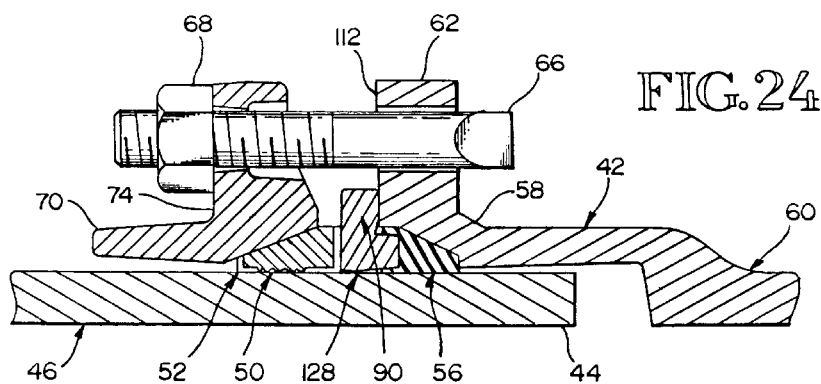

FIG. 15 is a cross sectional view of the improved gland, shown in FIG. 14, illustrating how a longitudinal rim like extension structure, extends oppositely from the inside wedged shaped surface structure, to create a structure, which substantially reduces any tendency of the circular body of this improved gland to noticeably deflect, upon tightening of bolts of a completed bolted joint, or later when fluids under high pressures are being controlled in the overall fluid piping system;

FIG. 16 is a cross section of the improved gland, shown in FIGS. 14 and 15, taken at one of several locations, where the gland bolt hole loop structures are located;

FIG. 17 is a cross section of the improved gland, shown in FIGS. 14, 15 and 16, taken at one of several locations where there are no gland bolt hole loop structures;

FIG. 18 is an elevational view of an embodiment of a grip ring having uniform pipe gripping circumferential teeth;

FIG. 19 is a side view of the grip ring, shown in FIG. 18, with lines indicating the gap of this ring;

FIG. 20 is a section view of a portion of the grip ring shown in FIGS. 18 and 19;

FIG. 21 is a section view of a portion of a grip ring having pipe gripping circumferential teeth of two different sizes;

FIG. 22 is an elevational view of another embodiment of the compression control ring, which is not symmetrical about the center thereof;

FIG. 23 is an edge view of the compression control ring, shown in FIG. 22, further illustrating the positioning of the integral stop tabs shown in FIG. 22;

FIG. 24 is a partial cross sectional view of the components of a bolted joint, which has been tightened and completed, when the non symmetrical compression control ring, shown in FIGS. 22 and 23, has been installed.

FIG. 25 is an elevational view of the gland, often utilized, before the utilization of the improved gland shown in FIGS. 14, 15, 16 and 17;

FIG. 26 is a cross sectional view of the gland shown in FIG. 25;

FIG. 27 is a partial and enlarged cross section of the gland shown in FIGS. 25 and 26, taken at one of several locations, where the gland bolt hole structures are located;

FIG. 28 is a partial and enlarged cross section of the gland, shown in FIGS. 25, 26 and 27, taken at one of several locations, where there are no gland bolt hole structures;

FIG. 29 is a partial view of a bolted joint, also referred to as a mechanical joint, with some portions removed, and with some portions cross sectioned, to show the assembly of a bolted joint having the gland, illustrated in FIGS. 25, 26, 27 and 28, and having the symmetrical compression control ring, shown in FIGS. 10, 11, 12 and 13; and FIG. 30 is an enlarged partial view, partially sectioned, of portions of the bolted joint, illustrated in FIG. 29, taken within the dotted line circle of FIG. 29, illustrating the gripping of the grip ring, and the stopping of the compression of the gasket, as the tabs of the compression control ring contact the flange of the pipe.

FIG. 31 illustrates how the skid pad in respect to another embodiment has both the smaller and larger upstanding resilient radial positioning structures formed initially tilted toward one another to create a gripping capability of the skid pad to be retained in position on the grip ring;

FIG. 32 shows an exploded view of three portions of an adhesive product, with a center laminate of a low density compressible material having an adhesive applied to both the top and bottom thereof, with cover laminates top and bottom for temporary adherence to the center laminate;

FIG. 33 depicts the assembly of the three laminates for their convenient handling before the installation, first to a skid pad, then later, with the skid pad to the grip ring, as the respective bottom and top laminates are sequentially removed to expose the adhesive surfaces on the bottom and top of the center laminate;

FIGS. 34 and 35 illustrate how the adhesive products, shown in FIGS. 32 and 33, have had the respective bottom laminates removed to expose the adhesives, and then respective adhesive products have been adhesively secured to respective embodiments of the skid pads;

FIGS. 36 and 37 illustrate how the top laminate has been removed from the installed adhesive products, shown in FIGS. 34 and 35, preparing the skid pads for adhesive securement to respective grip rings;

FIG. 38 depicts how the skid pad with the adhesively secured adhesive product is adhesively secured to the grip ring, and the grip ring is ready to slide into place before commencing to grip the outer surface structure of a pipe; and FIG. 39 illustrates how the grip ring at the final position thereof is gripping the outer surface structure of a pipe, without any interference of either the adhesive product or the skid pad's initial curved lower surface structure, which becomes deformed by the teeth of the grip ring, as the teeth are radially driven into the outer surface structure of a pipe.

DESCRIPTIONS OF THE PREFERRED EMBODIMENTS

Introduction

As noted in U.S. Pat. No. 5,335,946 entitled Cooperating Combination of a Gland and a Grip Ring Installed in Restrained Sealed Bolted Joints of Fluid Piping Systems Including Both Plastic and Metallic Pipe, upon the utilization of plastic pipes in fluid piping systems, many of the products used previously with metallic pipe could not be successfully used with plastic pipes. Therefore changes were made and are being made.

As illustrated in the accompanying drawings: improvements are made to a gland; a compression control ring is being used; and skid pads are placed on grip rings, assuring the grip rings will not prematurely commence gripping a pipe. Most of these changes were prompted, when better sealing of bolted joints, also referred to as mechanical joints, was sought and accomplished, when large diameter plastic pipes were being fitted in these bolted joints. These changes are also recognized as being beneficial when other diameter plastic and/or metallic pipes are being fitted in these bolted joints.

The Utilization of All the changes in a Bolted Joint Also Referred to as a Mechanical Joint In many locations 41 of fluid piping systems 40, which are primarily water and sewer piping systems, such as a location 41 illustrated in FIG. 1, one or more of these changes may be undertaken. All of these changes are particularly illustrated in FIGS. 1 through 4 in respect to how they relate to one another, and to the overall components of a bolted joint 42, also referred to as a mechanical joint 42.

In the exploded view of FIG. 2, essentially all the components of a bolted joint 42 are illustrated: the inserted plain end 44 of the pipe 46; the improved gland 48; the grip ring 50; the skid pads 52; the compression control ring 54; the gasket 56; and flanged end 58 of the pipe 60, having the flange 62 with holes 64 to receive the T bolts 66 and nuts 68, only shown in FIGS. 3 and 4.

The starting assembly of these components, before they are tightly grouped together and tightened upon securement of the nuts 68 on the T bolts 66, is shown in FIG. 3. The longitudinal rim like extension structure 70 of the improved gland 48 is illustrated in FIGS. 3 and 4. This rim like structure 70 extends in a direction opposite to the location of the inside wedge shaped surface structure 72, creating structure which substantially reduces any tendency of the circular body 74 of this improved gland 48 to noticeably deflect, upon tightening of the T bolts 66 and nuts 68 of the bolted joint 42, or later when fluids under high pressures are being controlled in the overall fluid piping system.

The grip ring 50, at spaced locations, is fitted with a skid pad 52, made of a material 78 which slidably engages the outer surface structure 80 of the pipe 46, and will continue to do so, as the various components are being moved together to become the bolted joint 42, as shown in FIG. 4. Yet this material 78, when the final tightening is underway, clears away, as necessary, so the pipe gripping circumferential teeth 82 create their gripping contact in the outer surface structure 80 of the pipe 46, as shown in FIG. 4.

The compression control ring 54, in the embodiment illustrated in FIGS. 2, 3 and 4 is symmetrical, and therefore is placed over pipe 46, without concern as to its positioning in this respect. It is located between the grip ring 50 and the gasket 56, and serves to transfer the gasket positioning force from the grip ring 50 to the gasket 56. The circular body 84 has the opposite alike area faces 86, which make contacts respectively with the grip ring 50 and the gasket 56. The height of each face 86 is slightly less than the height of the gasket 56.

This circular body 84 of the compression control ring 54 has spaced radially and outwardly extending stop tabs 90, which contact flange 62 on the flanged end 58 of the pipe 60, before the final tightening of the bolted joint 42. The compressive force, previously moving the gasket 56, often referred to as a plain rubber gasket or seal, into sealing contact with the pipe 46 and the gasket receiving portion 92 of the flange 62, in respect to the gasket receiving portion 92 thereof, completes this sealing function. Thereafter, any continuing attempt to compress the gasket 56 is prevented by tabs 90, which are in contact with the flange 62.

In addition to providing this protection of the gasket 56, the compression control ring 54, by being circumferentially continuous, serves to essentially uniformly transfer the axially directed forces to the gasket 56. Previously, when a compression control ring 54 was not included in a bolted joint 42, the grip ring 50 with its slot 94 was directly transferring these axially directed forces to the gasket 56, except at the locale of the slot 94. Therefore, the sealing in this locale was not always satisfactory, especially in respect to bolted joints 42 which were holding and sealing together larger pipes.

The gasket 56, in respect to its initial configuration, remains unchanged and meets the American Water Works Association, i.e. AWWA, standards set forth in C111-A21.11-90, section 11-8 pertaining to mechanical joints 42, i.e. bolted joints 42, as also set forth in these industry standards.

The respective positions of all these components, after the final tightening of the T bolts 66 and the nuts 68 of the bolted joint 42, or mechanical joint 42, is illustrated in FIG. 4.

The Preferred Embodiment of the Skid Pads and How They Function

When grip rings, such as grip ring 50, are to be relied upon to keep a plain end 44 of a pipe 46 in place in a bolted joint 42, the entire assembly of such a restrained and sealed bolted joint 42 must be correctly undertaken. The grip ring 50 must reach its proper location before completing its pipe gripping function. Therefore to insure the grip ring 50 will reach its proper location, skid pads 52 are initially fitted, at spaced locations, to each grip ring 50 as shown in FIG. 2. When so positioned they provide the respective sliding surface structures keeping the pipe gripping circumferential teeth 82 of the grip ring 50 from prematurely contacting the outer surface structure 80 of a pipe 46, as shown in FIGS. 3 and 5.

Yet, when the grip ring 50 is reaching and has reached its proper position, then the pipe gripping circumferential teeth 82 radially penetrate through the curved lower surface structure 96 of each of the skid pads 52, as illustrated in FIGS. 4 and 6, to complete the effective grip on the plain end 44 of the pipe 46. Preferably a plastic material is used in making a skid pad 52.

To positively or snugly position a skid pad 52 on a grip ring 50, it is formed to have an integral smaller upstanding radial positioning structure 98, at one end of its curved lower surface structure 96, and an integral larger upstanding radial positioning structure 100 at the other end of its curved lower surface structure 96.

These skid pads 52, in various sizes to match the various sizes of grip rings 50, are useful in conjunction with various types and sizes of pipe gripping circumferential teeth 82, and in reference to both plastic and metallic pipe 46, as respectively illustrated in FIGS. 7, 8 and 9.

The Preferred Embodiment of the Compression Control Ring Which is Symmetrical About its Circumferential Centerline The preferred embodiment of the compression control ring 54 is illustrated in FIGS. 2, 3, 4, 10, 11, 12, 13, 29 and 30. It is formed to be symmetrical about its circumferential centerline, and therefor it is always installed correctly in a bolted joint 42, as shown in FIGS. 3, 4, 29 and 30.

The compression control ring 54 is the integral arrangement of: a circular body 84 having an inside diameter 104, which is larger than an outside diameter of a pipe 46 of a fluid piping system 42; an outside diameter 106 of an interrupted circumferential surface structure 108 thereof, which is slightly smaller than an outside diameter of a plain rubber gasket 56; and spaced, radially, and outwardly, extending stop tabs 90, spaced centrally along the interrupted circumferential surface structure 108, creating the interruptions thereof.

The stop tabs 90, also referred to as compression stop tabs 90, are arranged for contacting respective portions of the flange 62 on the flanged end 58 of pipe 60, serving as a portion of mechanical joint fittings, which together complete a mechanical joint 42, also referred to as a bolted joint 42. When these stop tabs 90 contact the flange 62, the compressive force, previously moving a plain rubber gasket 56, or other gasket 56, into sealing contact with a pipe 46 and with the flange 62, is stopped with good sealing being undertaken, while protecting the gasket 56 from further unnecessary compression forces.

The circular body 84, has a width which is wider than the width of the stop tabs 90, thereby creating a longitudinal extending portion 110 on either side, each having alike area faces 86. It is adapted to contact and to sufficiently compress the gasket 56 to complete the sealing, in an advance time, before the radially extending stop tabs 90 contact the flange 62, to thereby stop the compression of the gasket 56, after the sealing has been completed.

Figure 10:
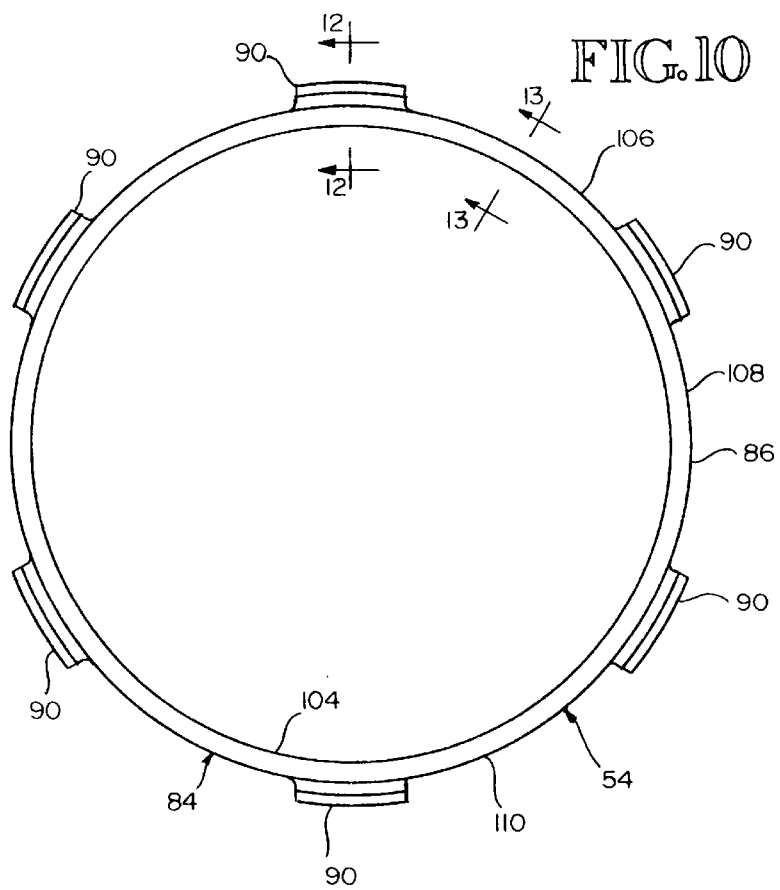
FIG. 10 is an elevational view of an embodiment of the compression control ring, and in this embodiment the view is similar when viewed from either side, i.e. this ring is symmetrical about the center thereof.
Figure 11:
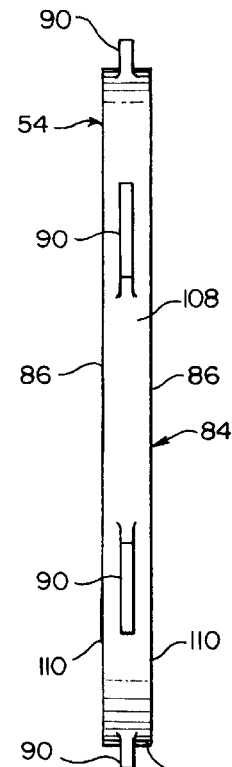
FIG. 11 is an edge view of the compression control ring shown in FIG. 10.
Figure 10A:
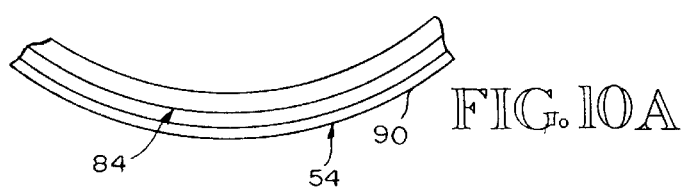
FIG. 10a is a partial elevational view of another embodiment of the compression control ring, which is generally smaller in diameter, having a continuous radially and outwardly extending stop tab like flange.
Figure 11A:
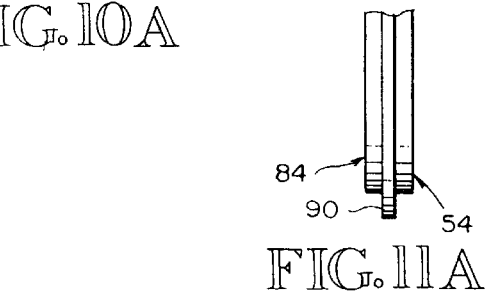
FIG. 11a is a partial edge view of the compression control ring shown in figure 10a, which has the continuous radially and outwardly extending stop tab like flange.

The spacing of the stop tabs 90 serves to conserve materials. In reference to smaller diameter compression control rings 54, the spacing might be eliminated and there would be a continuous stop tab 90. The embodiment of this smaller diameter compression control ring 54, having a continuous stop tab 90, is illustrated in the FIG. 10a, and in the FIG. 11a, both of which are partial views of this embodiment. The inside diameter 104 of a compression control ring 54 is always larger than the outside diameter of a pipe 46 to provide adequate clearance. The thickness or depth of a longitudinal extending portion 110 is slightly less than the height of a gasket 56, so the contacting movement of this portion 110 will always be directly effective in compressing the gasket 56 to create adequate sealing, as illustrated in FIG. 4, when the bolted joint 42 is completed.

The compression control ring 54 by being continuous insures a uniform transfer of the compressive forces against the gasket 56, from the gland 48, and grip ring 50. If a compression control ring 54 were not to be included in a bolted joint 42, especially when larger pipes were being connected together, the gasket volume located adjacent the slot 94 of the grip ring 50 would not be receiving the necessary compressive force. Also if a compression control ring 54 were not to be included, and the grip ring 50 was directly contacting the gasket 56, the gasket has, at times, extruded, in part, under the grip ring 50, during tightening of the bolted joint 42, causing these extended portions to be cut by the first pipe gripping circumferential tooth 82, also referred to as the front grip ring tooth 82.

Generally the gasket 56 will be compressed twenty to thirty percent when the stop tabs 90 on the compression control ring 54 hit or meet the face 112 of the flange 62 of the bolted joint 42. Once the compression control ring 54 has stopped, the remaining bolt torque is transferred directly into compressing the grip ring 50 onto the pipe 46. The extruded gasket material, if any, does not come near the pipe gripping circumferential teeth 82 of the grip ring 50.

Figure 12:
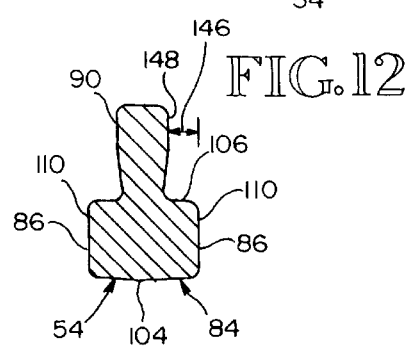
FIG. 12 is a cross section of the compression control ring, shown in FIGS. 10 an 11, taken at one of several circumferential locations where integral stop tabs are formed.
Figure 13:
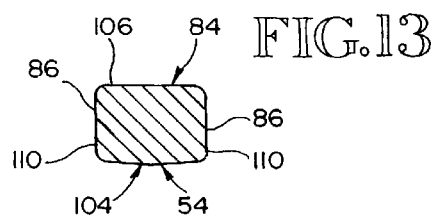
FIG. 13 is a cross section of the compression control ring, shown in FIGS. 10, 11 and 12, taken at one of several circumferential locations where no integral stop tabs are formed.

The respective cross sectional shapes of the compression control ring 54, are respectively illustrated in FIG. 12, where the stop tab 90 is formed, and in FIG. 13, where there is no stop tab 90.

The Preferred Embodiment of the Improved Gland

The preferred embodiment of the improved gland 48 illustrated in FIGS. 2, 3, 4, 14, 15, 16 and 17 is useful in any bolted joint 42, but this gland 48 is particularly useful, when large diameter pipes are being joined and sealed. The improved gland 48 has the integral arrangement of a circular body 74 having an inside diameter which is larger than the outside diameter of a pipe 46 of a fluid piping system 42. The outside diameter of the circular body 74 is larger than an outside diameter of a plain rubber gasket 56, or any other gasket 56 being utilized. This outside diameter is the diameter of an interrupted circumferential surface structure 116.

At the interruptions of this interrupted circumferential surface structure 116 there are the spaced radially and outwardly extending bolt receiving encirclement loop structures 118, which create the interruptions and extend out to a larger diameter. Between these bolt receiving encircle loop structures 118 in their reference plane, there is a reduction of material in reference to the prior use of material in these in between locations.

Additional material, however, is used in creating a longitudinal rim like extension 70, also referred to as a backward rim like extension, which substantially adds hoop stiffness to this gland, and thereby reduces any tendency of the circular body 74 of this improved gland 48, to noticeably deflect upon the tightening of nuts 68 on the bolts 66 of the bolted joint 42, or later when fluids under high pressures are being controlled in an overall fluid piping system. This backward rim like extension 70, which is directed substantially away from the location of the gasket 56, and also substantially away from the location of the nuts 68, when these nuts 68 are tightened on the bolts 66, essentially serves only this purpose of adding the hoop stiffness to this improved gland 48. Even though material is added to create this longitudinal rim like extension 70, the reduction of the material needed between the locations of the nuts 68 and bolts 66, generally results in a twenty per cent less overall weight of this improved gland 48, in reference to the glands previously utilized, when meeting the standards of the American Water Works Association, i.e. AWWA. The cross sectional form of this improved gland 48 is illustrated in FIG. 16, at the locale of one of several bolt receiving encirclement loop structures 118, and in FIG. 17, at one of the locales where there is no bolt receiving encirclement loop structure 118.

Each improved gland 48 has the inside wedge shape surface structure 72 which complementary fits the outside tapered wedge surface 122 of the grip ring 50. Also each improved gland 48 has a gland face 120 which is always directed toward the grip ring 50, compression control ring 54, the gasket 56, and the flange 62, during and after assembly of a bolted joint 42, also referred to as a mechanical joint 42.

The Grip Ring

Grip rings 50 are illustrated in FIGS. 2, 3, 4, 5, 6, 7, 8, 9, 18, 19, 20, 21, 24, 29 and 30. They all have the slot 94 to insure their adequate reduction in diameter, so their pipe gripping circumferential teeth 82 will very satisfactorily be gripping a pipe 46 at its plain end 44, after the tightening of the T bolts 66 and nuts 68 of the bolted joint 42. Each grip ring 50 has the outside tapered wedge surface 122, also referred to as a gripping mating wedge surface which is forcibly contacted by the improved gland 48, in respect to its inside wedged shape surface structure 72. Also each grip ring 50 has a face 124 which is directed toward the compression control ring 54.

The arrangements of the respective sizes of pipe gripping circumferential teeth 82 of grip rings 50 are illustrated in FIGS. 20 and 21. In FIG. 20 the teeth 82 are of uniform size, and in FIG. 21 at least two teeth 82 are larger than the remaining teeth 82. When different teeth sizes are utilized, the grip ring 50 is generally being used, when both plastic pipes and metallic pipes are being installed in a fluid piping system 42.

Another Embodiment of the Compression Control Ring

A compression control ring 128 of a different embodiment is illustrated in FIGS. 22, 23 and 24. The circular body 130 thereof is of reduced width and it only extends in the direction of the gasket 56, creating only one longitudinal extending portion 110 having a face 86, which contacts the gasket 56. The compression of the gasket continues until the stop tabs 90 of this circular body 130 contact the face 112 of the flange 62. These stop tabs 90 extend above the face 132 which is contacted by the grip ring 50, as shown in FIGS. 23 and 24.

Although the stop tabs 90 are positioned offset from the center along the interrupted circumferential surface structure 134 of the circular body 130, they still perform the compressive force limiting function to protect the gasket after the gasket has been adequately compressed to perform the sealing functions. Because this compression control ring 128 is not symmetrical, it must be installed only in one directional way, with the extending portion 110 being directed toward the gasket 56 during the arrangement of the bolted joint 42.

Other Possible Embodiments of Compression Control Rings

In addition to the illustrated compression control rings 54 and 128, other cross sectional shapes have been considered. In all embodiments a complete ring is preferred. In respect to the near centerline directional spacing 146 between pipe flange contacting surface structures 148 of the stop tabs 90 and the gasket contacting surface structures or faces 86 of a circular body of a compression control ring, this spacing 146, in regard to a specific size bolted joint 42, is always essentially the same. This spacing 146 is directly related to the amount of the allowable compression of the gasket 56. If the spacing 146 is too much, the gasket 56 will be over stressed. If the spacing 146 is not sufficient, the gasket 56 will not seal properly.

In whatever cross sectional shape a compression control ring may have, the integral arrangement of a body, which is adapted to encircle a pipe of a selected diameter, the body structure is arranged to have a first radial face to receive an axially directed closing force which is to be transmitted via a grip ring. This first radial face is, for example, the face 86, as illustrated in FIG. 12. The body structure is also arranged to have a second radial face to transmit a received axially directed closing force to a gasket. This second radial face is, for example, the other opposite face 86, as illustrated in FIG. 12. The body structure is also arranged to have a third radial face to contact a flange of a pipe being joined in a bolted joint. This third radial face is, for example, the face of the stop tab 90, as illustrated in FIG. 12. When this third radial face contacts a flange of a pipe, the transmission is stopped of any received axially directed closing force previously being applied to a gasket.

To Keep the Skid Pads Directly Associated With the Grip Rings During Shipment, Handling, and Final Installation Times, a Gripping Embodiment of a Skid Pad is Available and/or an Adhesive Product is Available When skid pads 52 are to be shipped, handled, and installed, when directly associated with respective grip rings 50, then a self holding skid pad embodiment 150 is provided, as illustrated in FIG. 31. Both the smaller and larger upstanding resilient radial positioning structures 152, 154 of this self holding skid pad embodiment 150 are initially tilted toward one another, to create a gripping or holding capability of this skid pad 150, to be retained in position on a respective grip ring 50.

The first embodiment 52 of the skid pad and this embodiment 150, may also be fitted with an adhesive product 158, which is illustrated in FIGS. 32 and 33. As noted in the exploded view of FIG. 32, a center laminate 160 of a low density easily compressible material is coated with an adhesive 162 on both the top and bottom, not shown, but indicated as to position, by the numeral 162. At the time of manufacture of this adhesive product 158, after the coating of adhesive 162, the adhesive 162 is respectively covered by the top and bottom easily removed temporary protective covering laminates 164, 166, as shown in FIG. 33. Preferably the center laminate 160, is made of a polyethylene foam material, which is one sixteenth of an inch thick.

Whenever the adhesive product 158 is to be positioned in a skid pad, the bottom temporary protective covering laminate 166 is easily removed, and the adhesive product 158 is respectively secured to either a skid pad 52 as illustrated in FIG. 34, or to a skid pad 150, as shown in FIG. 35, to further insure the skid pad 150 will remain in place later on when secured to a grip ring 50.

The top temporary protective covering laminate 164 is easily removed, as depicted in FIGS. 36 and 37, as the respective skid pads 52 and 150 are prepared for their spaced placement about respective grip rings 50.

The placement of skid pad 150 about a portion of a respective grip ring 50 at one selected spaced location, when the central laminate 160 is adhesively in place, is illustrated in FIG. 38. Then after the grip ring 50 has reached the gripping position and has been tightened, the resulting penetration of the pipe gripping circumferential teeth 82, is shown in FIG. 39. Both the central laminate 160, and the curved lower surface structure 96 of the skid pad 52 have been readily deformed and cleared away by the respective pipe gripping circumferential teeth 82.

Through the utilization of self holding skid pad 150 and/or the adhesive product 158, the manufacture of the components of a bolted joint is able to assist all persons involved in the handling, shipping, storing and installing of the grip rings, that the skid pads will be in place at the installation time.

The Use of the Compression Control Ring With Glands Previously Used and Still Being Used in Bolted Joints The compression control ring 54 is also effective when used with previously used glands 136, which are still being used, as illustrated in FIGS. 25 through 30. The material used in the body 138 of this gland is essentially distributed throughout the radial portions of this body, inclusive of the volumes 140, located between the bolt receiving loop structures 142. There is no longitudinal rim like extension structure. The respective cross sections are illustrated in FIGS. 27 and 28, where in FIG. 27, the location is by a bolt receiving loop structure 142, and where in FIG. 28, the location does not include a bolt receiving loop structure 142. The previously used glands 136, each have the inside wedge shaped structure 142, which contacts the outer tapered wedge surface of the grip ring 50.

A substantially complete and secured bolted joint 42 is shown in FIG. 29. Then in FIG. 30, enlarged portions of the same bolted joint 42 are illustrated to show how the compression control ring 54 is used with one of these previous types of glands 136.

I claim:

1. A compression control ring adapted for use in fluid piping systems, which are primarily water and sewer piping systems, whereby this compression control ring is adapted to be included in a cooperating combination of a gland and a grip ring for installations in respective types of bolted joints, also referred to as mechanical joints, having flanges, which also include plain rubber gaskets, serving to create and to maintain a fluid seal, comprising the integral arrangement of:

a circular body having:

an inside diameter larger than an outside diameter of a pipe of a fluid piping system;

an outside diameter, of an interrupted circumferential surface structure thereof, slightly smaller than an outside diameter of a plain rubber gasket; and spaced radially and outwardly extending stop tabs spaced along the interrupted circumferential surface structure, creating the interruptions thereof, and adapted for contacting a portion of a flange of a mechanical joint fitting, and thereby to be ready to stop a compressive force previously moving a plain rubber gasket into sealing contact with a pipe and with a flange.

2. A compression control ring, as claimed in claim 1, wherein the spaced radially and outwardly extending stop tabs are positioned centrally along the interrupted circumferential surface structure of the circular body.

3. A compression control ring, as claimed in claim 2, wherein the circular body has a longitudinal extending portion, which is adapted to contact and to compress a plain rubber gasket, in an advance time, before the extending stop tabs contact a flange of a mechanical joint, to thereby stop the compression of a plain rubber gasket.

4. A compression control ring, as claimed in claim 1, wherein the spaced radially and outwardly extending stop tabs are positioned offset from the center along the interrupted circumferential surface structure of the circular body.

5. A compression control ring, as claimed in claim 4, wherein the circular body has a longitudinal extending portion, which is adapted to contact and to compress a plain rubber gasket, in an advance time, before the extending stop tabs contact a flange of a mechanical joint, to thereby stop the compression of a plain rubber gasket.

6. A compression control ring adapted for use in fluid piping systems, which are primarily water and sewer piping systems, whereby this compression control ring is adapted to be included in a cooperating combination of a gland and a grip ring for installations in respective types of bolted joints, also referred to as mechanical joints, having flanges, which also include plain rubber gaskets, serving to create and to maintain a fluid seal, comprising the integral arrangement of:

a circular body having:

an inside diameter larger than an outside diameter of a pipe of a fluid piping system;

an outer diameter of a circumferential surface structure slightly smaller than an outer diameter of a plain rubber gasket;

a continuous radially and outwardly extending tab like flange, extending from the circumferential surface structure, and adapted for contacting a portion of a flange of a mechanical joint fitting, and thereby to be ready to stop a compressive force previously moving a plain rubber gasket into sealing contact with a pipe and with a flange.

7. A skid pad adapted for use in fluid piping systems, which are primarily water and sewer piping systems, whereby this skid pad is adapted to be included, with other skid pads, in a cooperating combination of a gland and a grip ring for installations in respective types of bolted joints, also referred to as mechanical joints, having flanges, which also include plain rubber gaskets, serving to create and to maintain a fluid seal, comprising the integral arrangement of:

a curved lower surface structure serving at the outset as a sliding surface structure, having an inside diameter substantially mating with an outside diameter of a pipe of a fluid piping system, and having an outside diameter substantially mating with an inside diameter of a grip ring;

a smaller upstanding radial positioning structure, at one end of the curved lower surface structure, adapted to snugly fit a smaller circular radial side of a grip ring; and a larger upstanding radial positioning structure, at the other end of the curved lower surface structure, adapted to snugly fit a larger circular radial side of a grip ring;

whereby a selected number of these skid pads are arranged at spaced circumferential positions on a grip ring, to be subsequently effective, during an assembly of a bolted joint, also referred to as a mechanical joint, to keep the grip ring from making a too early gripping contact with a pipe, and then subsequently, when necessary, being penetrated by gripping teeth of a grip ring during a final tightening of nuts on bolts of a bolted joint.

8. A skid pad adapted for use in fluid piping systems, as claimed in claim 7, wherein the smaller and the larger upstanding radial positioning structures are both tilted toward one another resulting in a better gripping action when the skid pad, in a selected location is positioned on a grip ring.

9. A skid pad adapted for use in fluid piping systems, as claimed in claim 8, comprising in addition, an adhesive product having a low density, easily compressible, material coated with an adhesive on both the top and bottom thereof, and the bottom thereof being adhered to the curved lower surface structure, at the top thereof, to thereby position the top of the low density, easily compressible material, to be adhered to pipe gripping circumferential teeth of a grip ring, whereby the skid pad is ready to be subsequently adhesively secured to a grip ring, and to so remain during an assembly of a bolted joint.

10. A skid pad adapted for use in fluid piping systems, as claimed in claim 9, wherein initially, for convenient handling thereof, the adhesive product has top and bottom, easily removed, temporary protective covering laminates placed over the adhesive surfaces of the low density, easily compressible material.

11. A skid pad adapted for use in fluid piping systems, as claimed in claim 7, comprising in addition, an adhesive product having a low density, easily compressible, material coated with an adhesive on both the top and bottom thereof, and the bottom thereof being adhered to the curved lower surface structure, at the top thereof, to thereby position the top of the low density, easily compressible material, to be adhered to pipe gripping circumferential teeth of a grip ring, whereby the skid pad is ready to be subsequently adhesively secured to a grip ring, and to so remain during an assembly of a bolted joint.

12. A skid pad adapted for use in fluid piping systems, as claimed in claim 11, wherein initially, for convenient handling thereof, the adhesive product has top and bottom, easily removed, temporary protective covering laminates placed over the adhesive surfaces of the low density, easily compressible material.

13. For fluid piping systems, which are primarily water and sewer piping systems, a cooperating combination of a gland, a grip ring, and a compression control ring, for installations in respective types of bolted joints, also referred to as mechanical joints, which include a gasket, comprising:

a. the grip ring having the integral arrangement of:
  i. a radial open through slot to accommodate the subsequent reduction of the internal diameter thereof;
  ii. a commencing internal diameter exceeding a diameter of a pipe to be subsequently engaged by the grip ring, when the diameter thereof is later reduced;
  iii. an internal surface structure having pipe gripping circumferential teeth;
  iv. an external inclined structure, commencing at a larger diameter end thereof, at a larger vertical shoulder thereof, which will initially face and later contact a compression control ring of a bolted joint, and terminating at a smaller diameter end at a smaller vertical shoulder thereof, which will initially face the gland of this cooperating combination;

b. the gland having the integral arrangement of:
  i. an internal surface structure, commencing at a larger diameter end thereof, at a vertical shoulder thereof, which faces the grip ring, and which faces in the direction of the gasket of the bolted joint, and terminating at a smaller diameter end thereof which initially faces and is nearer the smaller diameter end of the external inclined surface structure of the grip ring, when portions of this internal inclined surface structure are in forceful contact with portions of the external inclined structure of the grip ring, after installation, in a bolted joint, when the bolt and nut fasteners of the bolted joint are tightened; and
  ii. variable external surface structures including: a central body portion adjacent the internal inclined surface structure thereof; a flange extending out from the central body portion thereof; and spaced receiving hole structures extending out from the flange thereof to receive bolts of the bolted joint, which also will be received in spaced receiving hole structures of another piping structure, and thereafter, respective nuts are threaded on the installation bolts, and when these nuts are fully tightened a respective type of the bolted joint will be completed, insuring both the sealing contact of the gasket around the pipe as the grip ring presses the gasket into the sealing position, and providing adequate gripping contact of the grip ring about the pipe, whether it be a metal or plastic pipe; and c. the compression control ring having the integral arrangement of:
  a circular body having:
  an inside diameter larger than an outside diameter of a pipe of a fluid piping system;
  an outside diameter, of an interrupted circumferential surface structure thereof, slightly smaller than an outside diameter of a plain rubber gasket; and
  spaced radially and outwardly extending stop tabs spaced along the interrupted circumferential surface structure, creating the interruptions thereof, and adapted for contacting a portion of a flange of a mechanical joint fitting, and thereby to be ready to stop a compressive force previously moving a plain rubber gasket into sealing contact with a pipe and with a flange.

14. For fluid piping systems, which are primarily water and sewer piping systems, a cooperating combination of a gland, a grip ring, a compression control ring, and skid pads, for installations in respective types of bolted joints, also referred to as mechanical joints, which include a gasket, comprising:

a. the grip ring having the integral arrangement of:
  i. a radial open through slot to accommodate the subsequent reduction of the internal diameter thereof;
  ii. a commencing internal diameter exceeding a diameter of a pipe to be subsequently engaged by the grip ring, when the diameter thereof is later reduced;
  iii. an internal surface structure having pipe gripping circumferential teeth;
  iv. an external inclined structure, commencing at a larger diameter end thereof, at a larger vertical shoulder thereof, which will initially face and later contact a compression control ring of a bolted joint, and terminating at a smaller diameter end at a smaller vertical shoulder thereof, which will initially face the gland of this cooperating combination;

b. the gland having the integral arrangement of:
  i. an internal surface structure, commencing at a larger diameter end thereof, at a vertical shoulder thereof, which faces the grip ring, and which faces in the direction of the gasket of the bolted joint, and terminating at a smaller diameter end thereof which initially faces and is nearer the smaller diameter end of the external inclined surface structure of the grip ring, when portions of this internal inclined surface structure are in forceful contact with portions of the external inclined structure of the grip ring, after installation, in a bolted joint, when the bolt and nut fasteners of the bolted joint are tightened; and
  ii. variable external surface structures including: a central body portion adjacent the internal inclined surface structure thereof; a flange extending out from the central body portion thereof; and spaced receiving hole structures extending out from the flange thereof to receive bolts of the bolted joint, which also will be received in spaced receiving hole structures of another piping structure, and thereafter, respective nuts are threaded on the installation bolts, and when these nuts are fully tightened a respective type of the bolted joint will be completed, insuring both the sealing contact of the gasket around the pipe as the grip ring presses the gasket into the sealing position, and providing adequate gripping contact of the grip ring about the pipe, whether it be a metal or plastic pipe;

c. the compression control ring having the integral arrangement of:
    a circular body having:
    an inside diameter larger than an outside diameter of a pipe of a fluid piping system;
    an outside diameter, of an interrupted circumferential surface structure thereof, slightly smaller than an outside diameter of a plain rubber gasket; and
    spaced radially and outwardly extending stop tabs spaced along the interrupted circumferential surface structure, creating the interruptions thereof, and adapted for contacting a portion of a flange of a mechanical joint fitting, and thereby to be ready to stop a compressive force previously moving a plain rubber gasket into sealing contact with a pipe and with a flange; and d. the skid pads, each comprising the integral arrangement of:
    a curved lower surface structure serving at the outset as a sliding surface structure, having an inside diameter substantially mating with an outside diameter of a pipe of a fluid piping system, and having an outside diameter substantially mating with an inside diameter of a grip ring;
    a smaller upstanding radial positioning structure, at one end of the curved lower surface structure, adapted to snugly fit a smaller circular radial side of a grip ring; and
    a larger upstanding radial positioning structure, at the other end of the curved lower surface structure adapted to snugly fit a larger circular radial side of a grip ring;
    whereby a selected number of these skid pads are arranged at spaced circumferential positions on a grip ring, to be subsequently effective, during an assembly of a bolted joint, also referred to as a mechanical joint, to keep the grip ring from making a too early gripping contact with a pipe, and then subsequently, when necessary, being penetrated by gripping teeth of a grip ring during a final tightening of bolts of a bolted joint.

15. For fluid piping systems, which are primarily water and sewer piping systems, a cooperating combination of an improved gland, a grip ring, and a compression control ring for installations in respective types of bolted joints, also referred to as mechanical joints, which include a gasket, comprising:

a. the grip ring having the integral arrangement of:
    i. a radial open through slot to accommodate the subsequent reduction of the internal diameter thereof;
    ii. a commencing internal diameter exceeding a diameter of a pipe to be subsequently engaged by the grip ring, when the diameter thereof is later reduced;
    iii. an internal surface structure having pipe gripping circumferential teeth;
    iv. an external inclined structure, commencing at a larger diameter end thereof, at a larger vertical shoulder thereof, which will initially face and later contact a compression control ring of a bolted joint, and terminating at a smaller diameter end at a smaller vertical shoulder thereof, which will initially face the gland of this cooperating combination;

b. the improved gland comprising the integral arrangement of:
    a circular body having:
    an inside diameter larger than an outside diameter of a pipe of a fluid piping system;
    an outside diameter of an interrupted circumferential surface structure, larger than an outside maximum diameter of any integral portion of a compression control ring;
    spaced radially and outwardly extending bolt receiving encirclement loop structures spaced along the interrupted circumferential surface structure, creating the interruptions thereof;
    an inside wedge shaped surface structure adapted to complementary fit and mate with an outside wedge surface structure of a grip ring; and
    a longitudinal rim like extension structure, extending oppositely from the inside wedge shaped surface structure, creating structure which substantially reduces any tendency of the circular body to noticeably deflect upon tightening of nuts on bolts of a bolted joint, and when there is a high water pressure in a piping system; and c. the compression control ring comprising the integral arrangement of:
    a circular body having:
    an inside diameter larger than an outside diameter of a pipe of a fluid piping system;
    an outside diameter, of an interrupted circumferential surface structure thereof, slightly smaller than an outside diameter of a plain rubber gasket; and
    spaced radially and outwardly extending stop tabs spaced along the interrupted circumferential surface structure, creating the interruptions thereof, and adapted for contacting a portion of a flange of a mechanical joint fitting, and thereby to be ready to stop a compressive force previously moving a plain rubber gasket into sealing contact with a pipe and with a flange.

16. For fluid piping systems, which are primarily water and sewer piping systems, a cooperating combination of an improved gland, a grip ring, and a compression control ring, as claimed in claim 15, wherein:
    the spaced radially and outwardly extending stop tabs of the compression control ring are positioned centrally along the interrupted circumferential surface structure of the circular body.

17. For fluid piping systems, which are primarily water and sewer piping systems, a cooperating combination of an improved gland, a grip ring, and a compression control ring, as claimed in claim 16,
    wherein the circular body of the compression control ring has a longitudinal extending portion, which is adapted to contact and to compress a plain rubber gasket, in an advance time, before the extending stop tabs contact a flange of a mechanical joint, to thereby stop the compression of a plain rubber gasket.

18. For fluid piping systems, which are primarily water and sewer piping systems, a cooperating combination of an improved gland, a grip ring, and a compression control ring, as claimed in claim 15, wherein:

the spaced radially and outwardly extending stop tabs of the compression control ring are positioned offset from the center along the interrupted circumferential surface structure of the circular body.

19. For fluid piping systems, which are primarily water and sewer piping systems, a cooperating combination of an improved gland, a grip ring and a compression control ring, as claimed in claim 18, wherein the circular body of the compression control ring has a longitudinal extending portion, which is adapted to contact and to compress a plain rubber gasket, in an advance time, before the extending stop tabs contact a flange of a mechanical joint, to thereby stop the compression of a plain rubber gasket.

20. For fluid piping systems, which are primarily water and sewer piping systems, a cooperating combination of an improved gland, a grip ring, and skid pads, for installations in respective types of bolted joints, also referred to as mechanical joints, which include a gasket, comprising:

a. the grip ring having the integral arrangement of:
   i. a radial open through slot to accommodate the subsequent reduction of the internal diameter thereof;
   ii. a commencing internal diameter exceeding a diameter of a pipe to be subsequently engaged by the grip ring, when the diameter thereof is later reduced;
   iii. an internal surface structure having pipe gripping circumferential teeth;
   iv. an external inclined structure, commencing at a larger diameter end thereof, at a larger vertical shoulder thereof, which will initially face and later contact a compression control ring of a bolted joint, and terminating at a smaller diameter end at a smaller vertical shoulder thereof, which will initially face the gland of this cooperating combination;

b. the improved gland comprising the integral arrangement of:
   a circular body having:
   an inside diameter larger than an outside diameter of a pipe of a fluid piping system;
   an outside diameter of an interrupted circumferential surface structure, larger than an outside maximum diameter of any integral portion of a compression control ring;
   spaced radially and outwardly extending bolt receiving encirclement loop structures spaced along the interrupted circumferential surface structure, creating the interruptions thereof;
   an inside wedge shaped surface structure adapted to complementary fit and mate with an outside wedge surface structure of a grip ring; and
   a longitudinal rim like extension structure, extending oppositely from the inside wedge shaped surface structure, creating structure which substantially reduces any tendency of the circular body to noticeably deflect upon tightening of nuts on bolts of a bolted joint, and when there is a high water pressure in a piping system; and c. the skid pads, each comprising the integral arrangement of:
   a curved lower surface structure serving at the outset as a sliding surface structure, having an inside diameter substantially mating with an outside diameter of a pipe of a fluid piping system, and having an outside diameter substantially mating with an inside diameter of a grip ring;
   a smaller upstanding radial positioning structure, at one end of the curved lower surface structure, adapted to snugly fit a smaller circular radial side of a grip ring; and
   a larger upstanding radial positioning structure, at the other end of the curved lower surface structure, adapted to snugly fit a larger circular radial side of a grip ring;
   whereby a selected number of these skid pads are arranged at spaced circumferential positions on a grip ring, to be subsequently effective, during an assembly of a bolted joint, also referred to as a mechanical joint, to keep the grip ring from making a too early gripping contact with a pipe, and then subsequently, when necessary, being penetrated by gripping teeth of a grip ring during a final tightening of nuts on bolts of a bolted joint.

21. For fluid piping systems which are primarily water and sewer piping systems, a cooperating combination of an improved gland, a grip ring, a compression control ring, and skid pads for installations in respective types of bolted joints, also referred to as mechanical joints, which include a gasket, comprising:

a. the grip ring having the integral arrangement of:
   i. a radial open through slot to accommodate the subsequent reduction of the internal diameter thereof;
   ii. a commencing internal diameter exceeding a diameter of a pipe to be subsequently engaged by the grip ring, when the diameter thereof is later reduced;
   iii. an internal surface structure having pipe gripping circumferential teeth;
   iv. an external inclined structure, commencing at a larger diameter end thereof, at a larger vertical shoulder thereof, which will initially face and later contact a compression control ring of a bolted joint, and terminating at a smaller diameter end at a smaller vertical shoulder thereof, which will initially face the gland of this cooperating combination;

b. the improved gland comprising the integral arrangement of:
   a circular body having:
   an inside diameter larger than an outside diameter of a pipe of a fluid piping system;
   an outside diameter of an interrupted circumferential surface structure, larger than an outside maximum diameter of any integral portion of a compression control ring;
   spaced radially and outwardly extending bolt receiving encirclement loop structures spaced along the interrupted circumferential surface structure, creating the interruptions thereof;
   an inside wedge shaped surface structure adapted to complementary fit and mate with an outside wedge surface structure of a grip ring; and
   a longitudinal rim like extension structure, extending oppositely from the inside wedge shaped surface structure, creating structure which substantially reduces any tendency of the circular body to noticeably deflect upon tightening of nuts on bolts of a bolted joint, and when there is a high water pressure in a piping system; and c. the compression control ring comprising the integral arrangement of:
   a circular body having:
   an inside diameter larger than an outside diameter of a pipe of a fluid piping system;
   an outside diameter, of an interrupted circumferential surface structure thereof, slightly smaller than an outside diameter of a plain rubber gasket; and
   spaced radially and outwardly extending stop tabs spaced along the interrupted circumferential surface structure, creating the interruptions thereof, and adapted for contacting a portion of a flange of a mechanical joint fitting, and thereby to be ready to stop a compressive force previously moving a plain rubber gasket into sealing contact with a pipe and with a flange; and d. the skid pads, each comprising the integral arrangement of:

a curved lower surface structure serving at the outset as a sliding surface structure, having an inside diameter substantially mating with an outside diameter of a pipe of a fluid piping system, and having an outside diameter substantially mating with an inside diameter of a grip ring;

a smaller upstanding radial positioning structure, at one end of the curved lower surface structure, adapted to snugly fit a smaller circular radial side of a grip ring; and a larger upstanding radial positioning structure, at the other end of the curved lower surface structure, adapted to snugly fit a larger circular radial side of a grip ring;

whereby a selected number of these skid pads are arranged at spaced circumferential positions on a grip ring, to be subsequently effective, during an assembly of a bolted joint, also referred to as a mechanical joint, to keep the grip ring from making a too early gripping contact with a pipe, and then subsequently, when necessary, being penetrated by gripping teeth of a grip ring during a final tightening of bolts of a bolted joint.

22. For fluid piping systems, which are primarily water and sewer piping systems, a cooperating combination of an improved gland, a grip ring and skid pads, as claimed in claim 21, wherein the circular body of the compression control ring has a longitudinal extending portion, which is adapted to contact and to compress a plain rubber gasket, in an advance time, before the extending stop tabs contact a flange of a mechanical joint, to thereby stop the compression of a plain rubber gasket.

23. For fluid piping systems, which are primarily water and sewer piping systems, a cooperating combination of a gland, a grip ring and a compression control ring for installations in respective types of bolted joints, which include the continuing cooperation of at least one member having a gasket receiving volume, and a pipe end receiving volume, and holes to receive bolts, a gasket, and bolt and nut fasteners to draw together and secure the gland to the member that receives the gasket and the pipe end, comprising:

a. the member having a gasket receiving volume and the pipe end receiving volume and holes receiving bolts;

b. the gasket fitted into the gasket receiving volume;

c. bolt and nut fasteners, with the bolts passed through the holes both in the member and in the gland;

d. the pipe end fitted in the pipe end receiving volume;

e. the grip ring having the integral arrangement of:

i. a radial open through slot to accommodate the reduction of the internal diameter thereof, while providing a limited size reduction of the grip ring;

ii. a commencing internal diameter exceeding the diameter of the pipe engaged by the grip ring, when the diameter thereof has been reduced;

iii. an internal surface structure having pipe gripping circumferential teeth;

iv. an external inclined structure, commencing at a larger diameter end thereof, at a larger vertical shoulder thereof, which faces and contacts the gasket, and terminating at a smaller diameter end thereof at a smaller vertical shoulder thereof which faces the gland of the cooperating combination; and f. the gland having the integral arrangement of:

i. an internal surface structure, commencing at a larger diameter end thereof, at a vertical shoulder thereof, which faces the grip ring, and which faces in the direction of the gasket, and terminating at a smaller diameter end thereof which faces and is nearer the smaller diameter end of the external inclined structure of the grip ring, when portions of the internal inclined surface structure are in forceful contact with portions of the external inclined structure of the grip ring, upon installation when the engaging forces have been created when the bolt and nut fasteners have been tightened; and ii. variable external surface structures including a central body portion adjacent the internal inclined surface structure thereof; a flange extending out from the central body portion thereof; and spaced receiving hole structures extending out from the flange thereof which receive installation bolts, which are also received in spaced receiving hole structures of the member, which receives the gasket and the pipe end, and respective nuts are threaded and tightened on the respective installation bolts, and the respective type of the bolted joint is completed, insuring both the sealing contact of the gasket around the pipe, and that the grip ring has pressed the gasket into sealing position providing adequate gripping contact of the grip ring about the pipe; and g. a compression control ring comprising the integral arrangement of:

a circular body having:

an inside diameter larger than an outside diameter of the pipe end of this fluid piping system;

an outside diameter, of an interrupted circumferential surface structure thereof, slightly smaller than an outside diameter of the gasket; and spaced radially and outwardly extending stop tabs spaced along the interrupted circumferential surface structure, creating the interruptions thereof, and in contact with the member having the gasket receiving volume, thereby stopping the compressive force previously moving the gasket into sealing contact with the pipe end and the member having the gasket receiving volume.

24. For fluid piping systems, which are primarily water and sewer piping systems, a cooperating combination of a gland, a grip ring, and a compression control ring, as claimed in claim 23, comprising, in addition:

skid pads for the grip ring, each one comprising the integral arrangement of:

a curved lower surface structure serving at the outset as a sliding surface structure, having an inside diameter substantially mating with an outside diameter of a pipe of a fluid piping system, and having an outside diameter substantially mating with an inside diameter of a grip ring;

a smaller upstanding radial positioning structure, at one end of the curved lower surface structure, adapted to snugly fit a smaller circular radial side of a grip ring; and a larger upstanding radial positioning structure, at the other end of the curved lower surface structure, adapted to snugly fit a larger circular radial side of a grip ring;

whereby a selected number of these skid pads are arranged at spaced circumferential positions on a grip ring, to be subsequently effective, during an assembly of a bolted joint, also referred to as a mechanical joint, to keep the grip ring from making a too early gripping contact with a pipe, and then subsequently, when necessary, being penetrated by gripping teeth of a grip ring during a final tightening of bolts of a bolted joint.

25. For fluid piping systems, which are primarily water and sewer piping systems, a cooperating combination of an improved gland, a grip ring, and a compression control ring for installations in respective types of bolted joints, which include the continuing cooperation of at least one member having a gasket receiving volume, and a pipe end receiving volume, and holes to receive bolts, a gasket, and bolt and nut fasteners to draw together and secure the gland to the member that receives the gasket and the pipe end, comprising:

a. the member having a gasket receiving volume and the pipe end receiving volume and holes receiving bolts;
b. the gasket fitted into the gasket receiving volume;
c. bolt and nut fasteners, with the bolts passed through the holes both in the member and in the gland;
d. the pipe end fitted in the pipe end receiving volume;
e. the grip ring having the integral arrangement of:
   i. a radial open through slot to accommodate the reduction of the internal diameter thereof, while providing a limited size reduction of the grip ring;
   ii. a commencing internal diameter exceeding the diameter of the pipe engaged by the grip ring, when the diameter thereof has been reduced;
   iii. an internal surface structure having pipe gripping circumferential teeth;
   iv. an external inclined structure, commencing at a larger diameter end thereof, at a larger vertical shoulder thereof, which faces and contacts the gasket, and terminating at a smaller diameter end thereof at a smaller vertical shoulder thereof which faces the gland of the cooperating combination, tightening of the bolts of the bolted joint;
f. the improved gland having the integral arrangement of:
   a circular body having:
   an inside diameter larger than an outside diameter of the pipe end of a fluid piping system;
   an outside diameter, of an interrupted circumferential surface structure thereof, larger than an outside diameter of the gasket;
   spaced radially and outwardly extending bolt receiving encirclement loop structures spaced along the interrupted circumferential surface structure, creating the interruptions thereof;
   an inside wedge shaped surface structure complementary fitting and mating the external inclined structure of the grip ring; and
   a longitudinal rim like extension structure, extending oppositely from the inside wedge shaped surface structure, creating structure which substantially reduces any tendency of the circular body to noticeably deflect upon tightening of nuts on the bolts of the bolted joint, and when there is a high water pressure in a piping system; and
g. a compression control ring comprising the integral arrangement of:
   a circular body having:
   an inside diameter larger than an outside diameter of the pipe end
   an outside diameter, of an interrupted circumferential surface structure thereof, slightly smaller than an outside diameter of the gasket; and
   spaced radially and outwardly extending stop tabs spaced along the interrupted circumferential surface structure, creating the interruptions thereof, and in contact with the member having the gasket receiving volume, thereby stopping the compressive force previously moving the gasket into sealing contact with the pipe end and the member having the gasket receiving volume.

26. For fluid piping systems, which are primarily water and sewer piping systems, a cooperating combination of an improved gland, a grip ring, and a compression control ring, as claimed in claim 25, comprising in addition:

skid pads for the grip ring, each one comprising the integral arrangement of:
   a curved lower surface structure serving at the outset as a sliding surface structure, having an inside diameter substantially mating with an outside diameter of a pipe of a fluid piping system, and having an outside diameter substantially mating with an inside diameter of a grip ring;
   a smaller upstanding radial positioning structure, at one end of the curved lower surface structure, adapted to snugly fit a smaller circular radial side of a grip ring; and
   a larger upstanding radial positioning structure, at the other end of the curved lower surface structure, adapted to snugly fit a larger circular radial side of a grip ring;
   whereby a selected number of these skid pads are arranged at spaced circumferential positions on a grip ring, to be subsequently effective, during an assembly of a bolted joint, also referred to as a mechanical joint, to keep the grip ring from making a too early gripping contact with a pipe, and then subsequently, when necessary, being penetrated by gripping teeth of a grip ring during a final tightening of bolts of a bolted joint.

27. A bolted joint, also referred to as a mechanical joint, for fluid piping systems, which are primarily water and sewer piping systems, comprising:

a. at least one member having at least one gasket receiving volume portion which directs an incoming gasket into contact with a pipe, and at least one pipe end receiving volume portion, and spaced holes receiving installation bolts;
b. a gasket fitted into the gasket receiving volume portion of the member and directed into contact with the pipe;
c. installation bolt and nut fasteners, with the installation bolts passed through the holes both of the member and a gland;
d. the pipe having an end thereof fitted into the pipe end receiving volume portion of the member;
e. a grip ring surrounding the pipe near the end thereof having he integral arrangement of:
   i. a radial open through slot to accommodate the reduction of the internal diameter thereof, while providing a limited size reduction of the grip ring;
   ii. a commencing internal diameter exceeding the diameter of a pipe, which is fully engaged by the grip ring, when the diameter of the grip ring has been reduced when this bolted joint has been tightened;
   iii. an internal structure having pipe gripping circumferential teeth; and iv. an external inclined structure, commencing at a larger diameter end thereof, at a larger vertical shoulder thereof, which faces and contacts the gasket, and terminating at a smaller diameter end thereof at a smaller vertical shoulder thereof which faces and contacts the gland of the bolted joint.

f. the gland having the integral arrangement of:
i. an internal surface structure, commencing at a larger diameter end thereof, at a vertical shoulder thereof, which faces and contacts the grip ring, and which faces in the direction of the gasket, and terminating at a smaller diameter end of the external inclined structure of the grip ring, when portions of this internal inclined surface structure are in forceful contact with portions of the external inclined structure of the grip ring, upon installation, when the engaging forces have been created when the installation bolt and nut fasteners have been tightened; and
ii. variable external surface structures including a central body portion adjacent the internal inclined surface structure thereof; a flange extending out from the central body portion thereof; and the spaced receiving hole structures extending out from the flange thereof which received the installation bolts, which is also passed through the spaced receiving holes of the member, which receive the gasket and the pipe end, and respective nuts are threaded and tightened on the respective installation bolts, and this bolted joint is completed, insuring both the sealing contact of the gasket around the pipe, and that the grip ring has pressed the gasket into sealing position, providing adequate gripping contact of the grip ring about the pipe; and g. a compression control ring comprising the integral arrangement of:
a circular body having:
an inside diameter larger than an outside diameter of the pipe of the fluid piping system;
an outside diameter, of an interrupted circumferential surface structure thereof, slightly smaller than an outside diameter of the gasket; and
spaced radially and outwardly extending stop tabs spaced along the interrupted circumferential surface structure, creating the interruptions thereof, and contacting the at least one member, thereby stopping the compressive force previously moving the gasket into sealing contact with the pipe and the at least one member having at least one gasket receiving volume portion.

28. A bolted joint, also referred to as a mechanical joint, for fluid piping systems, which are primarily water and sewer piping systems, as claimed in claim 27, comprising, in addition:
skid pads for the grip ring, each one comprising the integral arrangement of:
a curved lower surface structure serving at the outset as a sliding surface structure, having an inside diameter substantially mating with an outside diameter of a pipe of a fluid piping system, and having an outside diameter substantially mating with an inside diameter of a grip ring;
a smaller upstanding radial positioning structure, at one end of the curved lower surface structure, adapted to snugly fit a smaller circular radial side of a grip ring; and
a larger upstanding radial positioning structure, at the other end of the curved lower surface structure, adapted to snugly fit a larger circular radial side of a grip ring;

whereby a selected number of these skid pads are arranged at spaced circumferential positions on a grip ring, to be subsequently effective, during an assembly of a bolted joint, also referred to as a mechanical joint, to keep the grip ring from making a too early gripping contact with a pipe, and then subsequently, when necessary, being penetrated by gripping teeth of a grip ring during a final tightening of bolts of a bolted joint.

29. A bolted joint, also referred to as a mechanical joint, for fluid piping systems, which are primarily water and sewer piping systems, comprising:
a. at least one member having at least one gasket receiving volume portion which directs an incoming gasket into contact with a pipe, and at least one pipe end receiving volume portion, and spaced holes receiving installation bolts;
b. a gasket fitted into the gasket receiving volume portion of the member and directed into contact with the pipe;
c. installation bolt and nut fasteners, with the installation bolts passed through the holes both of the member and a gland;
d. the pipe having an end thereof fitted into the pipe end receiving volume portion of the member;
e. a grip ring surrounding the pipe near the end thereof having the integral arrangement of:
i. a radial open through slot to accommodate the reduction of the internal diameter thereof, while providing a limited size reduction of the grip ring;
ii. a commencing internal diameter exceeding the diameter of a pipe, which is fully engaged by the grip ring, when the diameter of the grip ring has been reduced when this bolted joint has been tightened;
iii. an internal structure having pipe gripping circumferential teeth; and
iv. an external inclined structure, commencing at a larger diameter end thereof, at a larger vertical shoulder thereof, which faces and contacts the gasket, and terminating at a smaller diameter end thereof at a smaller vertical shoulder thereof which faces and contacts the gland of the bolted joint.

f. the improved gland having the integral arrangement of:
a circular body having:
an inside diameter larger than an outside diameter of the pipe end of a fluid piping system;
an outside diameter, of an interrupted circumferential surface structure thereof, larger than an outside diameter of the gasket;
spaced radially and outwardly extending bolt receiving encirclement loop structures spaced along the interrupted circumferential surface structure, creating the interruptions thereof;
an inside wedge shaped surface structure complementary fitting and mating the external inclined structure of the grip ring; and
a longitudinal rim like extension structure, extending oppositely from the inside wedge shaped surface structure, creating structure which substantially reduces any tendency of the circular body to noticeably deflect upon tightening of nuts on the bolts of the bolted joint, and when there is high water pressure in a piping system; and g. a compression control ring comprising the integral arrangement of:
a circular body having:
an inside diameter larger than an outside diameter of the pipe end of this fluid piping system;

an outside diameter, of an interrupted circumferential surface structure thereof, slightly smaller than an outside diameter of the gasket; and spaced radially and outwardly extending stop tabs spaced along the interrupted circumferential surface structure, creating the interruptions thereof, and in contact with the member having the gasket receiving volume, thereby stopping the compressive force previously moving the gasket into sealing contact with the pipe end and the member having the gasket receiving volume.

30. A bolted joint, also referred to as a mechanical joint, for fluid piping systems, which are primarily water and sewer piping systems, as claimed in claim 29, comprising, in addition:

skid pads for the grip ring, each one comprising the integral arrangement of:

a curved lower surface structure serving at the outset as a sliding surface structure, having an inside diameter substantially mating with an outside diameter of a pipe of a fluid piping system, and having an outside diameter substantially mating with an inside diameter of a grip ring;

a smaller upstanding radial positioning structure, at one end of the curved lower surface structure adapted to snugly fit a smaller circular radial side of a grip ring; and a larger upstanding radial positioning structure, at the other end of the curved lower surface structure, adapted to snugly fit a larger circular radial side of a grip ring;

whereby a selected number of these skid pads are arranged at spaced circumferential positions on a grip ring, to be subsequently effective, during an assembly of a bolted joint, also referred to as a mechanical joint, to keep the grip ring from making a too early gripping contact with a pipe, and then subsequently, when necessary, being penetrated by gripping teeth of a grip ring during a final tightening of bolts of a bolted joint.

31. A bolted joint for fluid piping systems, which are primarily water and sewer piping systems, comprising:

a. at least one member having at least one gasket receiving volume portion which directs an incoming gasket into contact with a pipe, and at least one pipe end receiving volume portion, and spaced holes receiving installation bolts;

b. a gasket fitted into the gasket receiving volume portion of the member and directed into contact with the pipe;

c. installation bolt and nut fasteners, with the installation bolts passed through the holes both of the member and a gland;

d. the pipe having an end thereof fitted into the pipe end receiving volume portion of the member;

e. a grip ring surrounding the pipe near the end thereof having the integral arrangement of:

i. a radial open through slot to accommodate the reduction of the internal diameter thereof, while providing a limited size reduction of the grip ring;

ii. a commencing internal diameter exceeding the diameter of a pipe, which is fully engaged by the grip ring, when the diameter of the grip ring has been reduced when this bolted joint has been tightened;

iii. an internal structure having at least two spaced major size pipe gripping circumferential teeth, and several spaced minor size pipe gripping circumferential teeth located between and beyond the major sized teeth, and the major teeth extend radially inwardly farther than the minor teeth within the grip ring;

iv. an external inclined structure, commencing at a larger diameter end thereof, at a larger vertical shoulder thereof, which faces and contacts the gasket, and terminating at a smaller diameter end thereof at a smaller vertical shoulder thereof which faces and contacts the gland of the bolted joint.

f. the gland having the integral arrangement of:

i. an internal surface structure, commencing at a larger diameter end thereof, at a vertical shoulder thereof, which faces and contacts the grip ring, and which faces in the direction of the gasket, and terminating at a smaller diameter end thereof which faces and is nearer the smaller diameter end of the external inclined structure of the grip ring, when portions of this internal inclined surface structure are in forceful contact with portions of the external inclined structure of the grip ring, upon installation, when the engaging forces have been created when the installation bolt and nut fasteners have been tightened; and ii. variable external surface structures including a central body portion adjacent the internal inclined surface structure thereof; a flange extending out from the central body portion thereof; and the spaced receiving hole structures extending out from the flange thereof which received the installation bolts, which is also passed through the spaced receiving holes of the member, which receive the gasket and the pipe end, and respective nuts are threaded and tightened on the respective installation bolts, and this bolted joint is completed, insuring both the sealing contact of the gasket around the pipe, and that the grip ring has pressed the gasket into sealing position, providing adequate gripping contact of the grip ring about the pipe; and g. a compression control ring comprising the integral arrangement of:

a circular body having:

an inside diameter larger than an outside diameter of the pipe of the fluid piping system;

an outside diameter, of an interrupted circumferential surface structure thereof, slightly smaller than an outside diameter of the gasket; and spaced radially and outwardly extending stop tabs spaced along the interrupted circumferential surface structure, creating the interruptions thereof, in contact with the member having the gasket receiving volume, thereby stopping the compressive force previously moving the gasket into sealing contact with the pipe end and the member having the gasket receiving volume.

32. A bolted joint, also referred to as a mechanical joint, for fluid piping systems, which are primarily water and sewer piping systems, as claimed in claim 31, comprising in addition:

skid pads for the grip ring, each one comprising the integral arrangement of:

a curved lower surface structure serving at the outset as a sliding surface structure, having an inside diameter substantially mating with an outside diameter of a pipe of a fluid piping system, and having an outside diameter substantially mating with an inside diameter of a grip ring;

a smaller upstanding radial positioning structure, at one end of the curved lower surface structure, adapted to snugly fit a smaller circular radial side of a grip ring; and a larger upstanding radial positioning structure, at the other end of the curved lower surface structure, adapted to snugly fit a larger circular radial side of a grip ring;

whereby a selected number of these skid pads are arranged at spaced circumferential positions on a grip ring, to be subsequently effective, during an assembly of a bolted joint, also referred to as a mechanical joint, to keep the grip ring from making a too early gripping contact with a pipe, and then subsequently, when necessary, being penetrated by gripping teeth of a grip ring during a final tightening of bolts of a bolted joint.

33. A bolted joint for fluid piping systems, which are primarily water and sewer piping systems, comprising:

a. at least one member having at least one gasket receiving volume portion which directs an incoming gasket into contact with a pipe, and at least one pipe end receiving volume portion, and spaced holes receiving installation bolts;

b. a gasket fitted into the gasket receiving volume portion of the member and directed into contact with the pipe;

c. installation bolt and nut fasteners, with the installation bolts passed through the holes both of the member and a gland;

d. the pipe having an end thereof fitted into the pipe end receiving volume portion of the member;

e. a grip ring surrounding the pipe near the end thereof having the integral arrangement of:

i. a radial open through slot to accommodate the reduction of the internal diameter thereof, while providing a limited size reduction of the grip ring;

ii. a commencing internal diameter exceeding the diameter of a pipe, which is fully engaged by the grip ring, when the diameter of the grip ring has been reduced when this bolted joint has been tightened;

iii. an internal structure having at least two spaced major size pipe gripping circumferential teeth and several spaced minor size pipe gripping circumferential teeth located between and beyond the major sized teeth, and the major teeth extend radially inwardly farther than the minor teeth within the grip ring;

iv. an external inclined structure, commencing at a larger diameter end thereof, at a larger vertical shoulder thereof, which faces and contacts the gasket, and terminating at a smaller diameter end thereof at a smaller vertical shoulder thereof which faces and contacts the gland of the bolted joint.

f. an improved gland having the integral arrangement of:
   a circular body having:
   an inside diameter larger than an outside diameter of the pipe end of a fluid piping system;
   an outside diameter, of an interrupted circumferential surface structure thereof, larger than an outside diameter of the gasket;
   spaced radially and outwardly extending bolt receiving encirclement loop structures spaced along the interrupted circumferential surface structure, creating the interruptions thereof;
   an inside wedge shaped surface structure complementary fitting and mating the external inclined structure of the grip ring; and
   a longitudinal rim like extension structure, extending oppositely from the inside wedge shaped surface structure, creating structure which substantially reduces any tendency of the circular body to noticeably deflect upon tightening of nuts on the bolts of the bolted joint, and when there is a high water pressure in a piping system; and g. a compression control ring comprising the integral arrangement of:
   a circular body having:
   an inside diameter larger than an outside diameter of the pipe of the fluid piping system;
   an outside diameter, of an interrupted circumferential surface structure thereof, slightly smaller than an outside diameter of the gasket; and
   spaced radially and outwardly extending stop tabs spaced along the interrupted circumferential surface structure, creating the interruptions thereof, in contact with the member having the gasket receiving volume, thereby stopping the compressive force previously moving the gasket into sealing contact with the pipe end and the member having the gasket receiving volume.

34. A bolted joint, also referred to as a mechanical joint, for fluid piping systems, which are primarily water and sewer piping systems, as claimed in claim 33, comprising in addition:

skid pads for the grip ring, each one comprising the integral arrangement of:
   a curved lower surface structure serving at the outset as a sliding surface structure, having an inside diameter substantially mating with an outside diameter of a pipe of a fluid piping system, and having an outside diameter substantially mating with an inside diameter of a grip ring;
   a smaller upstanding radial positioning structure, at one end of the curved lower surface structure, adapted to snugly fit a smaller circular radial side of a grip ring; and
   a larger upstanding radial positioning structure, at the other end of the curved lower surface structure, adapted to snugly fit a larger circular radial side of a grip ring;
   whereby a selected number of these skid pads are arranged at spaced circumferential positions on a grip ring, to be subsequently effective, during an assembly of a bolted joint, also referred to as a mechanical joint, to keep the grip ring from making a too early gripping contact with a pipe, and then subsequently, when necessary, being penetrated by gripping teeth of a grip ring during a final tightening of bolts of a bolted joint.

35. A compression control ring adapted for use in fluid piping systems, which are primarily water and sewer piping systems, whereby this compression control ring is adapted to be included in a cooperating combination of a gland and a grip ring for installation in respective types of bolted joints, also referred to as mechanical joints, having flanges, which also include plain rubber gaskets, serving to create and to maintain a fluid seal, comprising the integral arrangement of:

a body adapted to encircle a pipe having:

a first radial face to receive an axially directed closing force, to be transmitted via a grip ring;

a second radial face to transmit a received axially directed closing force to a gasket to be moved axially into sealing contacts with a pipe and a flange of a pipe being joined together; and a third radial face to contact a flange of a pipe being joined in a bolted joint and thereby stop any transmissions of a received axially directed closing force to a gasket;

whereby, a near centerline directional spacing between the third radial face which contacts a flange of a pipe and the second radial face which transmits an axially directed closing force to a gasket, in regard to a specific size bolted joint, is always essentially the same near centerline directional spacing, and this spacing is directly related to an amount of an allowable compression of a gasket which insures adequate sealing of a bolted joint, without over-stressing a gasket.

* * * * *